United States Patent
Yoshino et al.

(10) Patent No.: US 10,986,553 B2
(45) Date of Patent: Apr. 20, 2021

(54) TERMINAL DEVICE, COMMUNICATION SYSTEM, AND COMMUNICATION CONTROL METHOD

(71) Applicant: PANASONIC CORPORATION, Osaka (JP)

(72) Inventors: Masaaki Yoshino, Kanagawa (JP); Noriyuki Shimizu, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/646,810

(22) PCT Filed: Jun. 6, 2018

(86) PCT No.: PCT/JP2018/021765
§ 371 (c)(1),
(2) Date: Mar. 12, 2020

(87) PCT Pub. No.: WO2019/053970
PCT Pub. Date: Mar. 21, 2019

(65) Prior Publication Data
US 2020/0305052 A1    Sep. 24, 2020

(30) Foreign Application Priority Data
Sep. 15, 2017    (JP) .............................. JP2017-178218

(51) Int. Cl.
*H04W 36/30*    (2009.01)
*H04W 4/029*    (2018.01)
*H04W 24/08*    (2009.01)

(52) U.S. Cl.
CPC ........... *H04W 36/30* (2013.01); *H04W 4/029* (2018.02); *H04W 24/08* (2013.01)

(58) Field of Classification Search
CPC ..... H04W 4/025; H04W 4/026; H04W 4/029; H04W 4/06; H04W 24/08;
(Continued)

(56) References Cited

U.S. PATENT DOCUMENTS 6,622,151 B1 *  9/2003  Hamamoto  ......... G06F 11/1471
                                                707/999.202
10,645,698 B2 *  5/2020  Kato  ................. H04W 36/0022
(Continued)

FOREIGN PATENT DOCUMENTS

| JP | 2016-201729 | 12/2016 |
| JP | 2016-208371 | 12/2016 |
| JP | 2017-055257 | 3/2017 |

OTHER PUBLICATIONS

International Search Report (ISR) issued in International Pat. Appl. No. PCT/JP2018/021765, dated Sep. 4, 2018.

*Primary Examiner* — Jean A Gelin
(74) *Attorney, Agent, or Firm* — Greenblum & Bernstein, P.L.C.

(57) ABSTRACT

A terminal device is provided and includes a location information acquisition device configured to acquire location information including a location of the terminal device, a storage configured to accumulate history information on past communication status including a communication time of the terminal device at each location, and a controller configured to acquire the history information for a current location of the terminal device from the storage based on the location information, to extract one or more connection destinations as targets of communication quality measurement from connection destination candidates based on communication times for the connection destination candidates, and to measure communication quality levels of communications with the extracted connection destinations.

12 Claims, 30 Drawing Sheets

(58) Field of Classification Search
CPC ....... H04W 36/00835; H04W 36/0085; H04W 36/30; H04W 36/32; H04W 48/20; H04W 64/00; H04W 72/00; H04W 72/04; H04W 72/085; H04W 76/10
See application file for complete search history.

(56) References Cited

U.S. PATENT DOCUMENTS

| | | | |
|---|---|---|---|
| 2006/0068717 A1* | 3/2006 | Gandhi | H04W 48/06 455/67.13 |
| 2012/0263226 A1* | 10/2012 | Inohiza | H04N 19/37 375/240.02 |
| 2013/0273918 A1* | 10/2013 | Watanabe | H04W 36/0011 455/436 |
| 2016/0262043 A1* | 9/2016 | Zhang | H04M 3/2236 |
| 2017/0018190 A1* | 1/2017 | Yamasaki | G08G 1/207 |
| 2017/0164262 A1* | 6/2017 | Iihoshi | H04W 4/00 |
| 2018/0027545 A1 | 1/2018 | Kato | |
| 2018/0042056 A1* | 2/2018 | Hosoda | G06F 3/1238 |
| 2019/0268791 A1* | 8/2019 | Yoshino | H04W 64/006 |

\* cited by examiner

Fig.4

| Time [s] | mesh ID | cxn dest info ||| comm quality info |||
| | | cxn dest ID | frequency | comm method | reception power [dBm] | throughput [Mbps] | comm data amount [MBit] |
|---|---|---|---|---|---|---|---|
| 0 | 16097 | 101 | F1 | LTE | -90 | 20 | 20 |
| 1 | 16097 | 101 | F1 | LTE | -85 | 30 | 30 |
| 2 | 16297 | 103 | F3 | LTE-A | -75 | 100 | 100 |
| 3 | 16297 | 102 | F2 | NR | -70 | 600 | 600 |
| 4 | 16097 | 123 | F5 | WLAN | -70 | 200 | 200 |
| ... | ... | ... | ... | ... | ... | ... | ... |

Fig.5 past comm status (history info)

(A)

| mesh ID | cxn dest ID | comm time [s] |
|---|---|---|
| 16097 | 101 | 2 |
| 16097 | 123 | 1 |
| ⋮ | ⋮ | ⋮ | current comm status (B)

| mesh ID | cxn dest ID |
|---|---|
| 16097 | 123 |

(C)

| cxn dest ID | handover cost | exp comm time [s] |
|---|---|---|
| 101 | 0.5 | 1.5 |
| 123 | 0 | 1 |
| ⋮ | ⋮ | ⋮ |

*Fig.6*

| application | time required [s] |
|---|---|
| VoLTE call | 10 |
| video dstrb | 5 |
| talk (chat) | 1 |
| VoIP call | 5 |
| map dstrb | 2 |
| route assist | 5 |
| game | 1 |

Fig.9

| Time [s] | mesh ID | moving speed [km/h] | cxn dest info ||| comm quality info |||
| --- | --- | --- | --- | --- | --- | --- | --- | --- |
| | | | cxn dest ID | frequency | comm method | reception power [dBm] | throughput [Mbps] | comm data amount [MB] |
| 0 | 16097 | 5 | 101 | F1 | LTE | -90 | 20 | 20 |
| 1 | 16097 | 5 | 101 | F1 | LTE | -85 | 30 | 30 |
| 2 | 16297 | 10 | 103 | F3 | LTE-A | -75 | 100 | 100 |
| 3 | 16298 | 10 | 102 | F2 | NR | -70 | 600 | 600 |
| 4 | 16097 | 10 | 123 | F5 | WLAN | -70 | 200 | 200 |
| ... | ... | ... | ... | ... | ... | ... | ... | ... |

Fig.10 past communication status (history info)

(A)

| mesh ID | cxn dest ID | comm time [s] | moving speed [km/h] |
|---|---|---|---|
| 16097 | 101 | 2 | 5 |
| 16097 | 123 | 1 | 10 |
| ⋮ | ⋮ | ⋮ | ⋮ | current communication status (B)

| mesh ID | cxn dest ID |
|---|---|
| 16097 | 123 |

(C)

| cxn dest ID | handover cost | exp comm time [s] |
|---|---|---|
| 101 | 0.5 | 0.75 |
| 123 | 0 | 1 |
| ⋮ | ⋮ | ⋮ |

Fig.13

| Time [s] | mesh ID | current cons [mA] | cxn dest info ||| comm quality info |||
| | | | cxn dest ID | frequency | comm method | reception power [dBm] | throughput [Mbps] | comm data amount [MB] |
|---|---|---|---|---|---|---|---|---|
| 0 | 16097 | 500 | 101 | F1 | LTE | -90 | 20 | 20 |
| 1 | 16097 | 400 | 101 | F1 | LTE | -85 | 30 | 30 |
| 2 | 16297 | 500 | 103 | F3 | LTE-A | -75 | 100 | 100 |
| 3 | 16298 | 300 | 102 | F2 | NR | -70 | 600 | 600 |
| 4 | 16097 | 200 | 123 | F5 | WLAN | -70 | 200 | 200 |
| … | … | … | … | … | … | … | … | … |

Fig.14

(A) past communication status (history info)

| mesh ID | cxn dest ID | current cons [mA] |
|---|---|---|
| 16097 | 101 | 450 |
| 16097 | 123 | 200 |
| ⋮ | ⋮ | ⋮ |

(B) current communication status

| mesh ID | cxn dest ID |
|---|---|
| 16097 | 123 |

(C)

| cxn dest ID | handover cost | exp current cons [mA] |
|---|---|---|
| 101 | 0.5 | 500 |
| 123 | 0 | 200 |
| ⋮ | ⋮ | ⋮ |

Fig.15

| application | current cons required [mA] |
|---|---|
| VoLTE call | 150 |
| video dstrb | 350 |
| talk (chat) | 200 |
| VoIP call | 200(LTE)、100(WLAN) |
| map dstrb | 500 |
| route assist | 200 |
| game | 400 |

Fig.17

| Time [s] | mesh ID | app performing comm | current cons [mA] | cxn dest info ||| comm quality info |||
|---|---|---|---|---|---|---|---|---|---|
| | | | | cxn dest ID | frequency | comm method | reception power [dBm] | throughput [Mbps] | comm data amount [MB] |
| 0 | 16097 | A | 500 | 101 | F1 | LTE | -90 | 20 | 20 |
| 1 | 16097 | A | 400 | 101 | F1 | LTE | -85 | 30 | 30 |
| 2 | 16297 | A | 500 | 103 | F3 | LTE-A | -75 | 100 | 100 |
| 3 | 16298 | B | 300 | 102 | F2 | NR | -70 | 600 | 600 |
| 4 | 16097 | B | 200 | 123 | F5 | WLAN | -70 | 200 | 200 |
| ... | ... | ... | ... | ... | ... | ... | ... | ... | ... |

*Fig.18* past communication status (history info)

(A)

| mesh ID | cxn dest ID | app performing comm | current cons [mA] |
|---|---|---|---|
| 16097 | 101 | A | 450 |
| 16097 | 123 | B | 200 |
| ⋮ | ⋮ | ⋮ | ⋮ | current communication status (B)

| mesh ID | cxn dest ID | app performing comm |
|---|---|---|
| 16097 | 123 | B |

(C)

| cxn dest ID | handover cost | exp current cons [mA] |
|---|---|---|
| 101 | 0.5 | 550 |
| 123 | 0 | 200 |
| ⋮ | ⋮ | ⋮ |

*Fig.22*

| moving speed [km/h] | moving distance during cxn dest search delay time (different freq) [m] | moving distance during cxn dest search delay time (same freq) [m] |
|---|---|---|
| 3 | 3.2 | 0.8 |
| 10 | 10.7 | 2.8 |
| 20 | 21.3 | 5.6 |
| 50 | 53.3 | 13.9 |

Fig.23
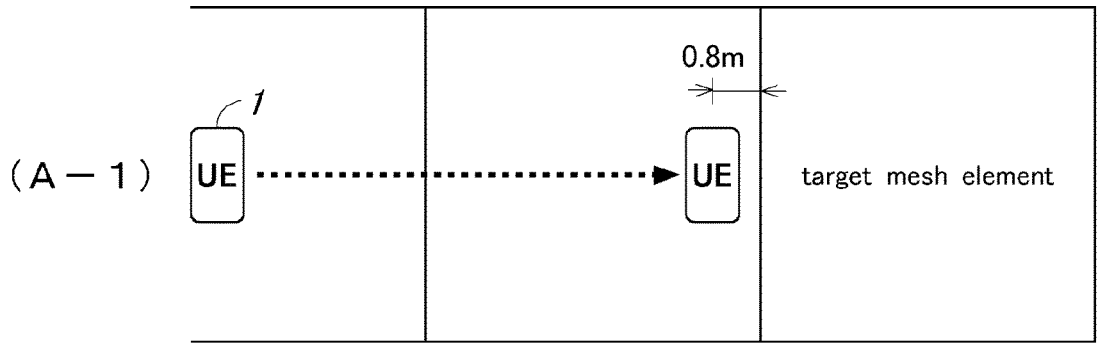
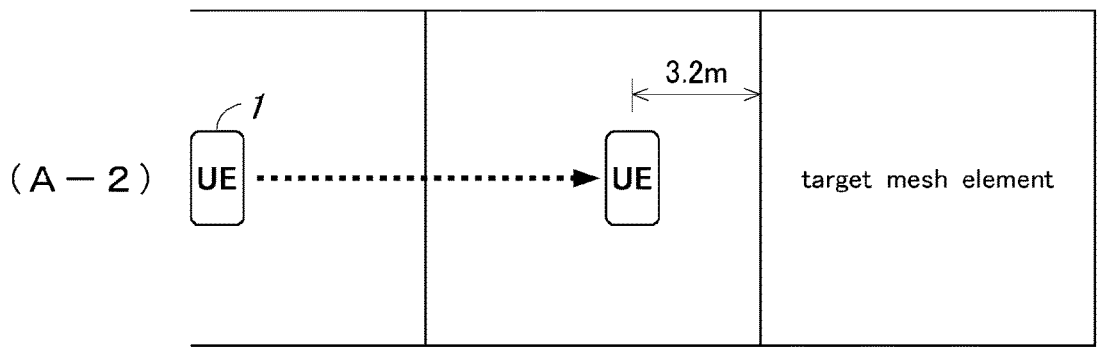
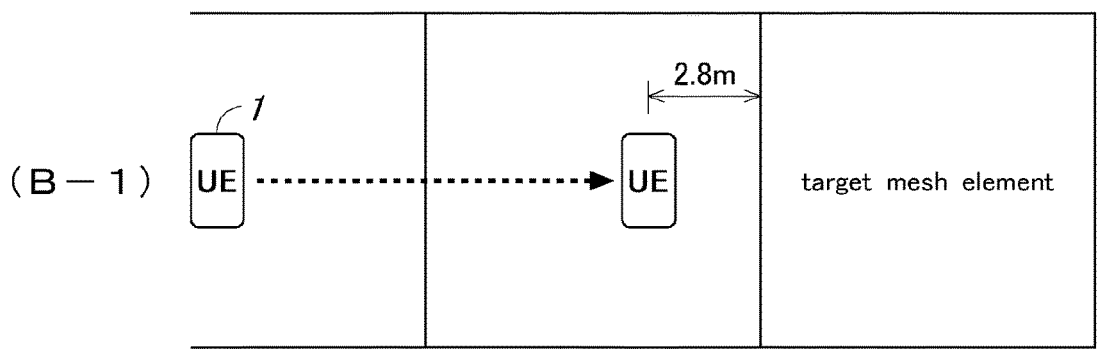
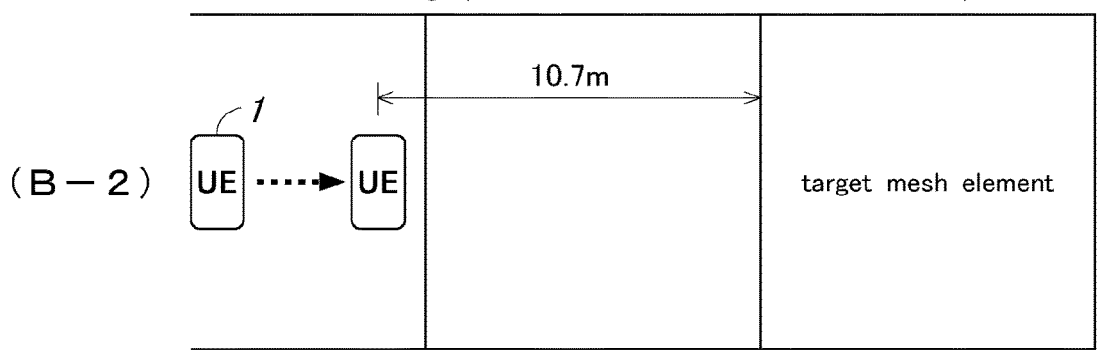

Fig.25
(A)
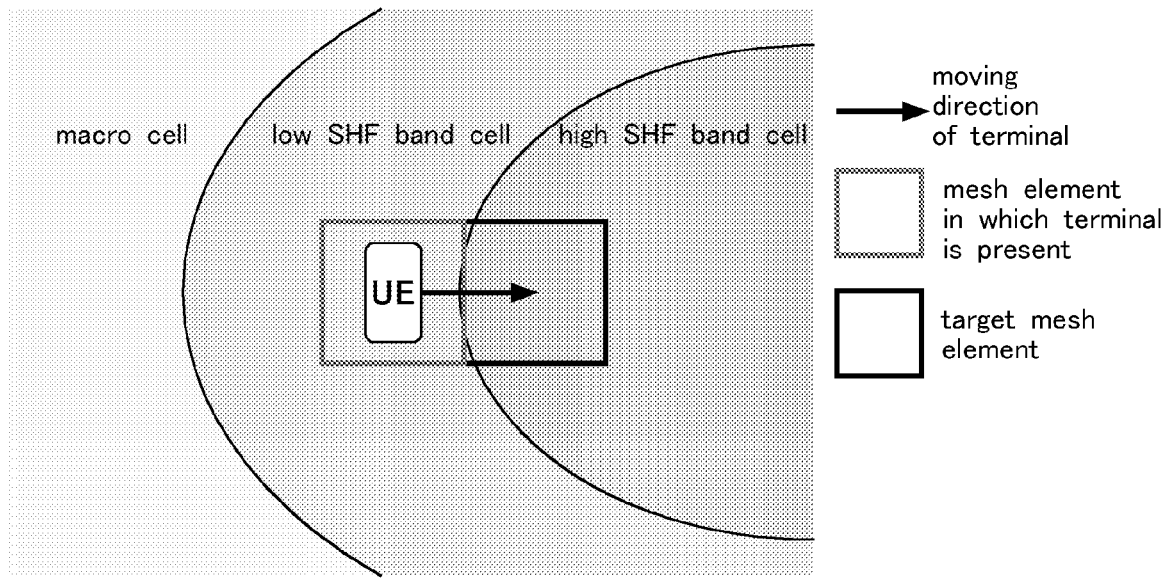
(B)
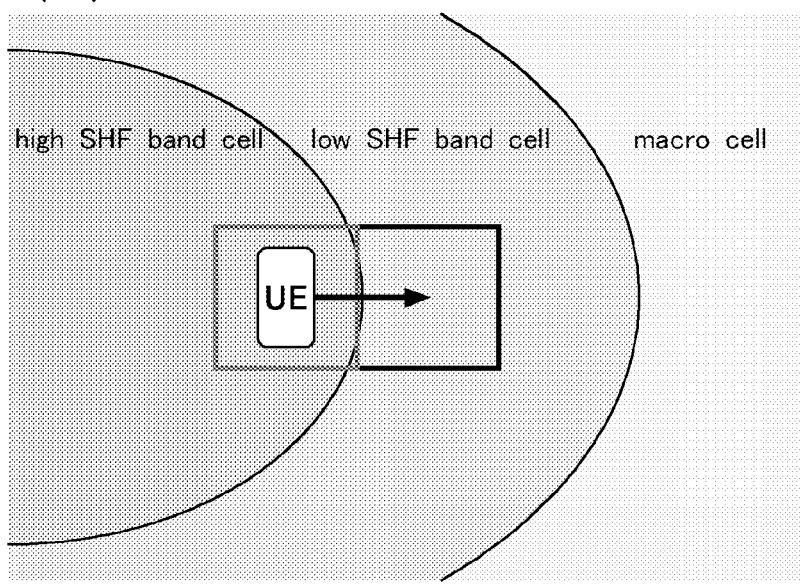

Fig.26
(A)
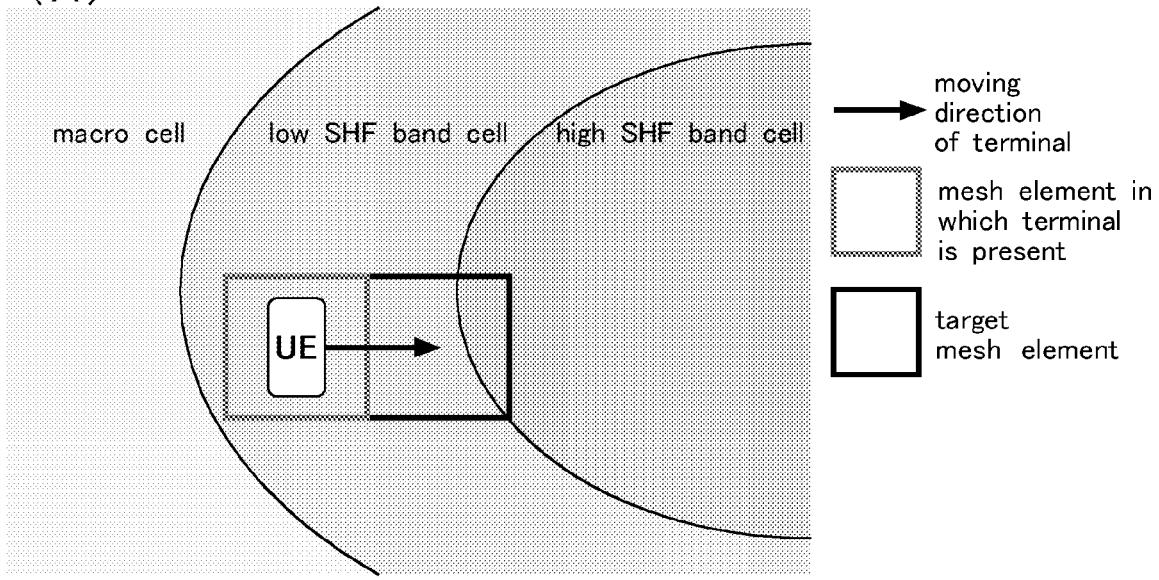
(B)
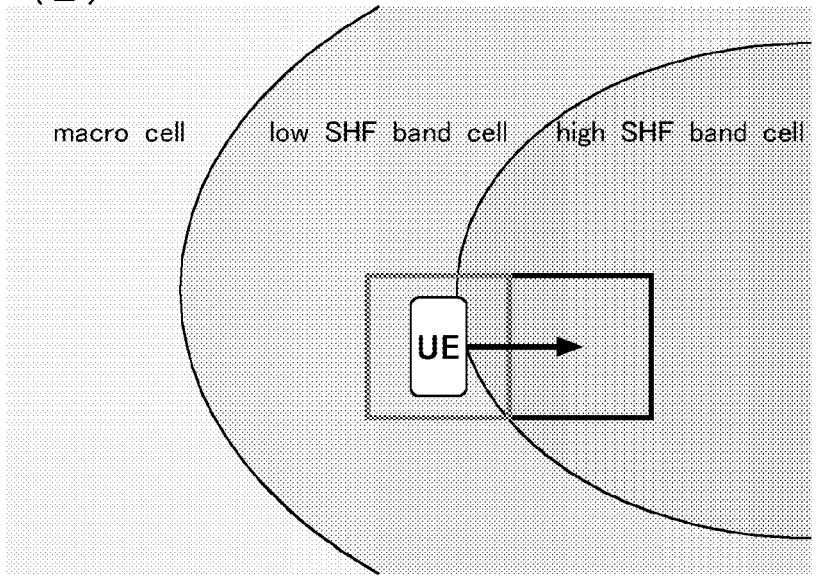

TERMINAL DEVICE, COMMUNICATION SYSTEM, AND COMMUNICATION CONTROL METHOD

TECHNICAL FIELD

The present invention relates to a terminal device for communicating with one or more base station devices, a base station device for communicating with terminal devices, a communication system comprising a terminal device and base station devices, and a communication control method performed by a terminal device for communicating with one or more base station devices.

BACKGROUND ART

In recent years, various wireless communication methods such as LTE (Long Term Evolution) and wireless LAN communication have been widely used. In the future, 5G systems (next generation mobile communication systems) are expected to be additionally available, which will expand a range of choices of connection destinations for a terminal device. In particular, a 5G communication system (fifth generation mobile communication system), which includes a number of small cells using a high SHF (Super High Frequency) band, needs to perform a number of control operations for selection of a connection destination, which requires substantial time to finish selecting a connection destination. Thus, there is a need for technology to efficiently extract an optimal connection destination from a large number of connection destination candidates.

Known technologies used to efficiently extract a connection destination include a system in which a base station is configured to transmit connection destination candidate list to a terminal device, where the connection destination candidate list indicates connection destinations connectable to the terminal device, and the terminal device is configured to, upon receiving the list, select one or more connection destinations as targets of communication quality measurement from the connection destinations in the list, to prioritize the selected connection destinations, to measure communication quality levels of communications with the selected connection destinations in the order of priority, and to transmit a measurement report including results of the communication quality measurement to the base station. (See Patent Document 1)

PRIOR ART DOCUMENT(S)

Patent Document(s)

Patent Document 1: JP2017-055257A

SUMMARY OF THE INVENTION

Task to be Accomplished by the Invention

In such systems, a terminal device performs a connection destination search operation (cell search operation) to extract an optimal connection destination, which operation involves measuring communication quality levels of communications with connection destinations. Thus, if a system is configured such that targets of communication quality measurement are narrowed down so as to shorten a time required for communication quality measurement operations, a relatively larger proportion of a communication time can be used to transmit user data, which is expected to effectively increase a system's processing capacity. In addition, if targets of communication quality measurement are narrowed down, unnecessary measurement operations are avoided, which results in a decrease in power consumption of a terminal device.

In a system of the above-described prior art, if the system is configured to narrow down connection destinations as targets of communication quality measurement before extracting a connection destination, the system's processing capacity is expected to be effectively increased. However, in the above-described prior art, since a terminal device uses reference information provided from a base station as a basis for selection of connection destinations as targets of communication quality measurement, the base station disadvantageously bears an increased processing load. Thus, there is a need for technology which enables a terminal device to narrow down connection destinations as targets of communication quality measurement so that the terminal device can efficiently extract a proper connection destination, without increasing a processing load on a base station.

In particular, in 5G communication systems, a system usually includes a number of small cells. Thus, there is a problem that unnecessary handovers can frequently occur, resulting in an increase in occurrence of short breaks in communication, which hinders improvement in the system's processing capacity. Moreover, there is another problem that transmission of unnecessary measurement reports increases a total amount of communications, which increases power consumption of a terminal device and also increases a load on the network. Furthermore, there is yet another problem is that unnecessary handovers to remotely-located connection destinations can occur, resulting in an increase in power consumption of a terminal device.

The present invention has been made in view of such problems of the prior art, and a primary object of the present invention is to provide a terminal device, a communication system, and a communication control method, which enable each terminal device to narrow down targets of communication quality measurement, thereby allowing a terminal device to efficiently search and find a proper connection destination and minimizing occurrence of unnecessary handovers to improve a system's processing capacity.

Means to Accomplish the Task

An aspect of the present invention provides a terminal device for communicating with one or more base station devices, the terminal device comprising: a location information acquisition device configured to acquire location information including a location of the terminal device; a storage configured to accumulate history information on past communication status, the past communication status including at least a communication time of the terminal device at each location; a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations.

Another aspect of the present invention provides a communication system comprising a terminal device and one or more base station devices which perform communication with the terminal device, wherein the terminal device comprises: a location information acquisition device configured to acquire location information including a location of the terminal device; a storage configured to accumulate history information on past communication status, the past communication status including at least a communication time of the terminal device at each location; and a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations.

Yet another aspect of the present invention provides a communication control method performed by a terminal device for communicating with one or more base station devices, the method comprising: acquiring location information including a location of the terminal device; acquiring history information for a current location of the terminal device from accumulated history information on past communication status, the past communication status including at least a communication time of the terminal device at each location; extracting one or more connection destinations as targets of communication quality measurement from connection destination candidates, the connection destination candidates being the base station devices connectable to the terminal device, based on communication times for the connection destination candidates; and measuring communication quality levels of communications with the extracted connection destinations.

Effect of the Invention

According to the present invention, since each terminal device is configured to narrow down targets of communication quality measurement based on history information accumulated therein, a terminal device can efficiently search and find a proper connection destination, without increasing a processing load on a base station.

BRIEF DESCRIPTION OF THE DRAWINGS

FIG. 4 is an explanatory view showing an example for illustrating data sets recorded in a history database;

FIG. 5 is an explanatory view showing an outline of processing operations performed by a measurement target extractor 23 according to the first embodiment of the present invention;

FIG. 6 is an explanatory view showing an example of a communication time table according to the first embodiment of the present invention;

FIG. 9 is an explanatory view showing an example for illustrating data sets recorded in history database according to a second embodiment of the present invention;

FIG. 10 is an explanatory view showing an outline of processing operations performed by a measurement target extractor 23 according to the second embodiment of the present invention;

FIG. 13 is an explanatory view showing an example for illustrating data sets recorded in history database according to the third embodiment of the present invention;

FIG. 14 is an explanatory view showing an outline of processing operations performed by a measurement target extractor 23 according to the third embodiment of the present invention;

FIG. 15 is an explanatory view showing an example of a current consumption table according to the third embodiment of the present invention;

FIG. 17 is an explanatory view showing an example for illustrating data sets recorded in history database according to a fourth embodiment of the present invention;

FIG. 18 is an explanatory view showing an outline of processing operations performed by a measurement target extractor 23 according to the fourth embodiment of the present invention;

FIG. 22 is an explanatory view showing examples of moving distances of the terminal 1 during connection destination search delay times for respective moving speeds of the terminal 1 according to the fifth embodiment of the present invention;

FIG. 23 is an explanatory view showing examples for illustrating timing of starting a connection destination search operation by the terminal 1 according to the fifth embodiment of the present invention;

FIG. 25 is an explanatory view showing an example for illustrating effects achieved by the connection destination search operation according to the fifth embodiment of the present invention;

FIG. 26 is an explanatory view showing an example for illustrating effects achieved by the connection destination search operation according to the fifth embodiment of the present invention;

DESCRIPTION OF THE PREFERRED EMBODIMENT(S)

Figure 1:
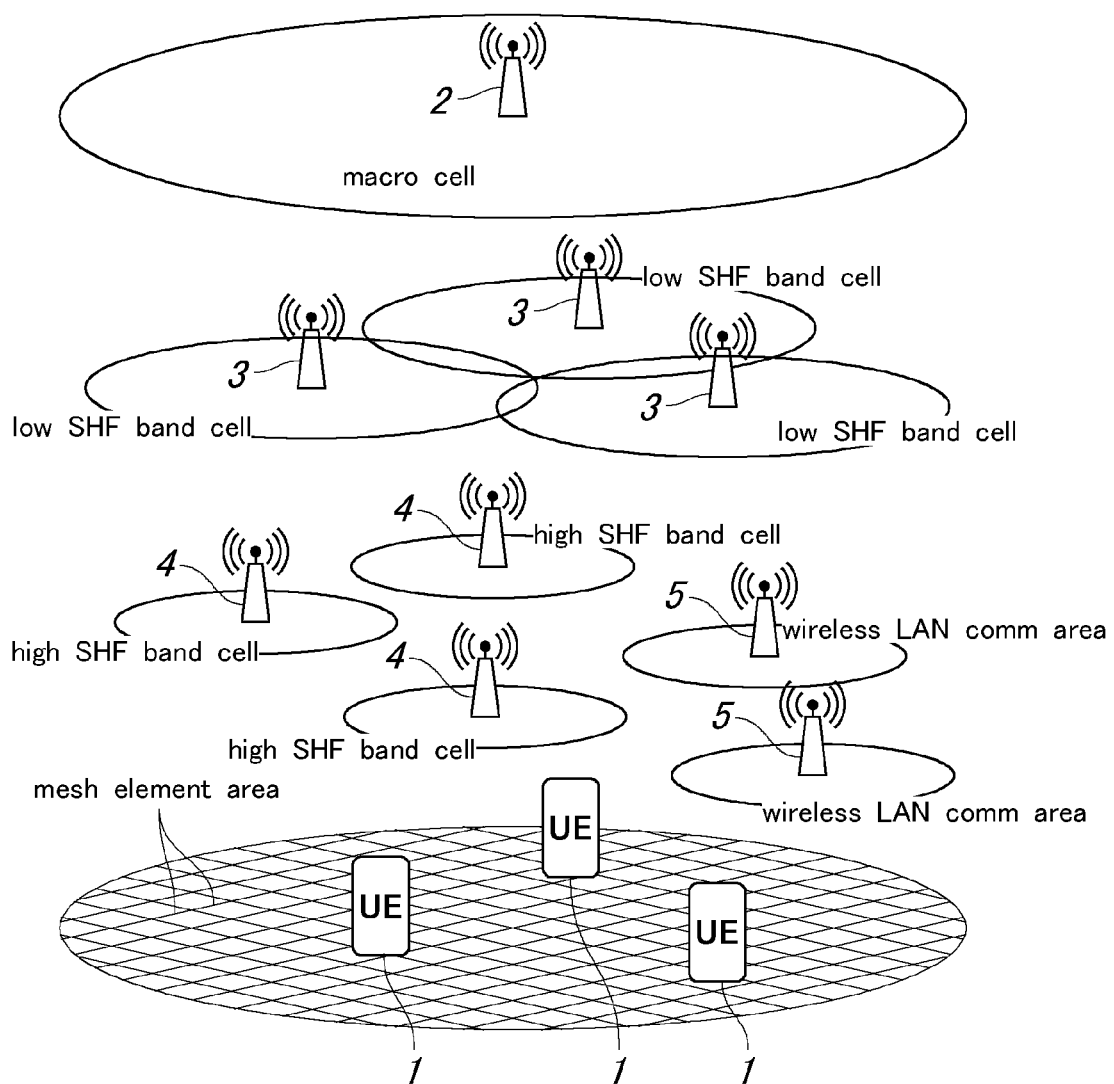
FIG. 1 is a diagram showing a general configuration of a communication system according to a first embodiment of the present invention.

A first aspect of the present invention made to achieve the above-described object is a terminal device for communicating with one or more base station devices, the terminal device comprising: a location information acquisition device configured to acquire location information including a location of the terminal device; a storage configured to accumulate history information on past communication status, the past communication status including at least a communication time of the terminal device at each location; a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations.

In this configuration, since each terminal device is configured to narrow down targets of communication quality measurement based on history information accumulated in the terminal device, a terminal device can efficiently search and find a proper connection destination, without increasing a processing load on a base station. Specifically, since each terminal device is configured to narrow down targets of communication quality measurement in consideration of past communication times, a terminal device can properly narrow down targets of communication quality measurement. In addition, when a terminal device is configured to narrow down targets of measurement to connection destinations for which past communication times are relatively long, this configuration can reduce occurrence of short breaks in communication caused by handovers.

A second aspect of the present invention is the terminal device of the first aspect, wherein the controller is configured to predict a destination area of the terminal device based on a moving state of the terminal device, the moving state being estimated based on the location information, and to extract the connection destinations as the targets of communication quality measurement bases on the respective communication times for connection destination candidates associated with the destination area.

In this configuration, since the terminal device narrows down the targets of communication quality measurement bases on the respective communication times for connection destination candidates associated with a destination area, the terminal device can efficiently search and find an optimal connection destination.

A third aspect of the present invention is the terminal device of the first aspect, wherein the controller is configured to correct the respective communication times for connection destination candidates so as to lower an evaluation of a connection destination candidate to which a handover is necessary for the terminal device to start communication therewith, and to extract the communication destinations as the targets of communication quality measurement based on the corrected communication times.

This configuration minimizes occurrence of unnecessary handovers and thus reduces short breaks in communication caused by handovers to thereby improve a system's processing capacity. Moreover, this configuration can reduce an amount of unnecessary measurement reports to thereby decrease power consumption of a terminal device and a load on the network.

A fourth aspect of the present invention is the terminal device of the first aspect, wherein the storage stores a communication time table including a required communication time for each application, and wherein the controller is configured to acquire an expected communication time for each connection destination candidate based on a corresponding communication time and a corresponding handover cost, the handover cost being preset based on whether or not a handover is necessary for the terminal device to start communication therewith, to acquire a required communication time for an application currently performing communication based on the communication time table, and to select one or more connection destinations, the selected connection destinations having expected communication times which are equal to or greater than the required communication time, as the targets of communication quality measurement.

This configuration minimizes occurrence of unnecessary handovers. Moreover, since the terminal device is configured to narrow down targets of communication quality measurement in consideration of a type of application currently performing communication, this configuration can improve users' QoE (Quality of Experience).

A fifth aspect of the present invention is the terminal device of the first aspect, wherein the storage accumulates the history information which further includes a moving speed at each location, and wherein the controller is configured to extract the communication destinations as the targets of communication quality measurement bases on the communication times for the connection destination candidates and the moving speeds related thereto.

In this configuration, since the terminal device narrows down the targets of communication quality measurement in consideration of past moving speeds in addition to past communication times, the terminal device can properly narrow down targets of communication quality measurement.

A sixth aspect of the present invention is the terminal device of the fifth aspect, wherein the storage stores a communication time table including a required communication time for each application, and wherein the controller is configured to acquire an expected communication time for each connection destination candidate based on a corresponding communication time and a corresponding handover cost, the handover cost being preset based on whether or not a handover is necessary for the terminal device to start communication therewith, to acquire a required communication time for an application currently performing communication based on the communication time table, and to select one or more connection destinations, the selected connection destinations having expected communication times which are equal to or greater than the required communication time, as the targets of communication quality measurement.

This configuration minimizes occurrence of unnecessary handovers. Moreover, since the terminal device is configured to narrow down targets of communication quality measurement in consideration of a type of application currently performing communication, this configuration can improve users' QoE (Quality of Experience).

A seventh aspect of the present invention is a terminal device for communicating with one or more base station devices, the terminal device comprising: a location information acquisition device configured to acquire location information including a location of the terminal device; a storage configured to accumulate history information on past communication status, the past communication status including at least a current consumption of the terminal device at each location; a controller configured to acquire the history information for a current location of the terminal device from the storage based on the location information, to extract one or more connection destinations as targets of communication quality measurement from connection destination candidates, the connection destination candidates being the base station devices connectable to the terminal device, based on current consumptions for the connection destination candidates, and to measure communication quality levels of communications with the extracted connection destinations.

In this configuration, since each terminal device is configured to narrow down targets of communication quality measurement based on history information accumulated in the terminal device in the same manner as the first aspect, a terminal device can efficiently search and find a proper connection destination, without increasing a processing load on a base station. Specifically, since each terminal device is configured to narrow down targets of communication quality measurement in consideration of past current consumptions, a terminal device can properly narrow down targets of communication quality measurement. In addition, when a terminal device is configured to narrow down targets of measurement to connection destinations for which past current consumptions are relatively low, this configuration can reduce power consumption of the terminal device.

An eighth aspect of the present invention is the terminal device of the seventh aspect, wherein the storage stores a current consumption table including a required current consumption for each application, and wherein the controller is configured to acquire an expected current consumption for each connection destination candidate based on a corresponding current consumption and a corresponding handover cost, the handover cost being preset based on whether or not a handover is necessary for the terminal device to start communication therewith, to acquire a required current consumption for an application currently performing communication based on the current consumption table, and to select one or more connection destinations, the selected connection destinations having expected current consumptions which are equal to or greater than the required current consumption, as the targets of communication quality measurement.

This configuration minimizes occurrence of unnecessary handovers. Moreover, since the terminal device is configured to narrow down targets of communication quality measurement in consideration of a type of application currently performing communication, this configuration can improve users' QoE (Quality of Experience).

A ninth aspect of the present invention is the terminal device of the seventh aspect, wherein the storage accumulates application ID information indicating each application ID of an application currently performing communication, and wherein the controller is configured to extract the communication destinations as the targets of communication quality measurement bases on the current consumptions for the connection destination candidates and the application ID information for an application currently performing communication.

In this configuration, since the terminal device narrows down the targets of communication quality measurement in consideration of a type of application currently performing communication in addition to past current consumptions, the terminal device can properly narrow down targets of communication quality measurement.

A tenth aspect of the present invention is the terminal device of the ninth aspect, wherein the storage stores a current consumption table including a required current consumption for each application, and wherein the controller is configured to acquire an expected current consumption for each connection destination candidate based on a corresponding current consumption, the application ID information, and a corresponding handover cost, the handover cost being preset based on whether or not a handover is necessary for the terminal device to start communication therewith, to acquire a required current consumption for an application currently performing communication based the current consumption table, and to select one or more connection destinations, the selected connection destinations having expected current consumptions which are equal to or greater than the required current consumption, as the targets of communication quality measurement.

This configuration minimizes occurrence of unnecessary handovers. Moreover, since the terminal device is configured to narrow down targets of communication quality measurement in consideration of a type of application currently performing communication, this configuration can improve users' QoE (Quality of Experience).

An eleventh aspect of the present invention is a communication system comprising a terminal device and one or more base station devices which perform communication with the terminal device, wherein the terminal device comprises: a location information acquisition device configured to acquire location information including a location of the terminal device; a storage configured to accumulate history information on past communication status, the past communication status including at least a communication time of the terminal device at each location; and a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations.

In this configuration, since each terminal device is configured to narrow down targets of communication quality measurement in the same manner as the first aspect, a terminal device can efficiently search and find a proper connection destination, without increasing a processing load on a base station. Specifically, since each terminal device is configured to narrow down targets of communication quality measurement in consideration of past communication times, a terminal device can properly narrow down targets of communication quality measurement.

A twelfth aspect of the present invention is a communication system comprising a terminal device and one or more base station devices which perform communication with the terminal device, wherein the terminal device comprises: a location information acquisition device configured to acquire location information including a location of the terminal device; a storage configured to accumulate history information on past communication status, the past communication status including at least a current consumption of the terminal device at each location; and a controller configured to acquire the history information for a current location of the terminal device from the storage based on the location information, to extract one or more connection destinations as targets of communication quality measurement from connection destination candidates, the connection destination candidates being the base station devices connectable to the terminal device, based on current consumptions for the connection destination candidates, and to measure communication quality levels of communications with the extracted connection destinations.

In this configuration, since each terminal device is configured to narrow down targets of communication quality measurement in the same manner as the seventh aspect, a terminal device can efficiently search and find a proper connection destination, without increasing a processing load on a base station. Specifically, since each terminal device is configured to narrow down targets of communication quality measurement in consideration of past current consumptions, a terminal device can properly narrow down targets of communication quality measurement.

A thirteenth aspect of the present invention is a communication control method performed by a terminal device for communicating with one or more base station devices, the method comprising: acquiring location information including a location of the terminal device; acquiring history information for a current location of the terminal device from accumulated history information on past communication status, the past communication status including at least a communication time of the terminal device at each location; extracting one or more connection destinations as targets of communication quality measurement from connection destination candidates, the connection destination candidates being the base station devices connectable to the terminal device, based on communication times for the connection destination candidates; and measuring communication quality levels of communications with the extracted connection destinations.

In this configuration, since each terminal device is configured to narrow down targets of communication quality measurement in the same manner as the first aspect, a terminal device can efficiently search and find a proper connection destination, without increasing a processing load on a base station. Specifically, since each terminal device is configured to narrow down targets of communication quality measurement in consideration of past communication times, a terminal device can properly narrow down targets of communication quality measurement.

A fourteenth aspect of the present invention is a communication control method performed by a terminal device for communicating with one or more base station devices, the method comprising: acquiring location information including a location of the terminal device; acquiring history information for a current location of the terminal device from accumulated history information on past communication status, the past communication status including at least a current consumption of the terminal device at each location; extracting one or more connection destinations as targets of communication quality measurement from connection destination candidates, the connection destination candidates being the base station devices connectable to the terminal device, based on current consumptions for the connection destination candidates; and measuring communication quality levels of communications with the extracted connection destinations.

In this configuration, since each terminal device is configured to narrow down targets of communication quality measurement in the same manner as the seventh aspect, a terminal device can efficiently search and find a proper connection destination, without increasing a processing load on a base station. Specifically, since each terminal device is configured to narrow down targets of communication quality measurement in consideration of past current consumptions, a terminal device can properly narrow down targets of communication quality measurement.

Embodiments of the present invention are described in the following with reference to the appended drawings.

First Embodiment

FIG. 1 is a diagram showing a general configuration of a communication system according to a first embodiment of the present invention.

The communication system includes terminals 1 (terminal devices, denoted as UEs 1 in the drawings), a macro cell base station 2 (base station device), low SHF band base stations 3 (base station devices), high SHF band base stations 4 (base station devices), and wireless LAN base stations 5 (access points, base station devices). The macro cell base station, the low SHF band cell bases stations, the high SHF band cell stations, and the wireless LAN base stations are disposed so that their communication coverage areas can overlap one another.

The terminal 1 may be a smartphone, a tablet terminal, and any other type of terminal. The terminal 1 is capable of communicating with any of the macro cell base station 2, the low SHF band base stations 3, the high SHF band base stations 4, and the wireless LAN base stations 5.

The macro cell base station 2 performs wireless communication using a UHF band (frequency: 300 MHz to 3 GHz). A low SHF band base station 3 performs wireless communication using a low SHF band (frequency: 3 GHz to 6 GHz). A high SHF band base station 4 performs wireless communication using a high SHF band (frequency: 6 GHz to 80 GHz band). A wireless LAN base station 5 performs wireless LAN communication using a wireless communication method such as a WiFi (Registered Trademark) communication system or a WiGig (Registered Trademark) communication system.

In the present embodiment, a mesh area consisting of mesh element areas is determined for an area covering all the communication coverage areas of the macro cell, the low SHF band cells, the high SHF band cells, and the wireless LAN base stations such that the mesh element areas have a uniform size and a prescribed shape (for example, a square, a circle, an ellipse), and each terminal 1 includes a history database configured to accumulate history information on past communication status associated with each mesh element area. Furthermore, a terminal 1 stores location information including locations of respective mesh elements, and recognizes the mesh element area in which the terminal 1 is currently located.

Figure 2:
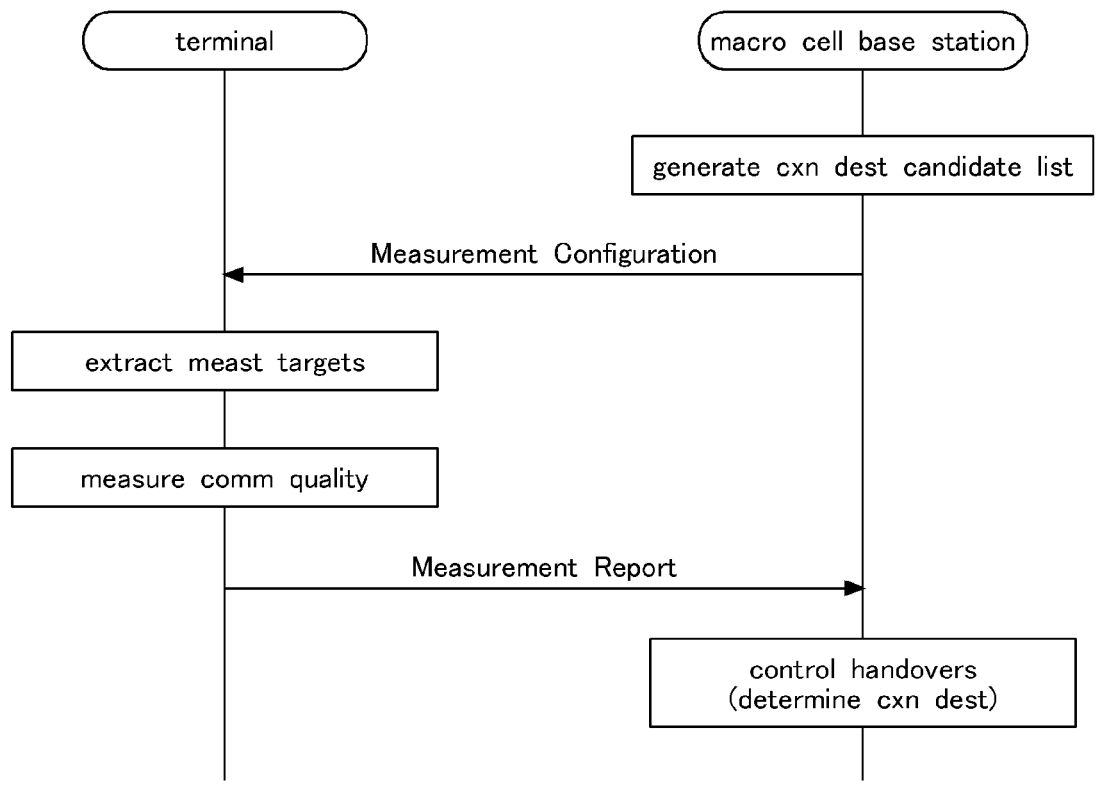
FIG. 2 is a sequence diagram showing an outline of operations of a terminal 1 and a macro cell base station 2.

Next, operations performed by a terminal 1 and the macro cell base station 2 will be described. FIG. 2 is a sequence diagram showing an outline of operations of the terminal 1 and the macro cell base station 2.

The macro cell base station 2 first generates a connection destination candidate list, in which base stations 2 to 5, which are connectable to a terminal 1 of interest, are listed as connection destination candidates. Then, the macro cell base station 2 transmits a measurement control message (Measurement Configuration), the message including the connection destination candidate list, to the terminal 1.

Upon receiving the measurement control message (Measurement Configuration) transmitted from the macro cell base station 2, the terminal 1 extracts connection destination candidates as targets of communication quality measurement using a history database. In this process step, the terminal 1 specifies a mesh element area in which the terminal 1 is currently located, and, based on history information for the specified mesh element area, extracts one or more connection destinations as targets of communication quality measurement from connection destination candidates included in the list.

Next, the terminal 1 measures communication quality levels (e.g. SINRs) of communications with the connection destinations extracted as targets of communication quality measurement. If a result of the communication quality measurement meets a condition for reporting the measurement result, the terminal 1 transmits a measurement report message (Measurement Report) including the result of communication quality measurement to the macro cell base station 2.

Upon receiving the measurement report message (Measurement Report) transmitted from the terminal 1, the macro cell base station 2 proceeds to a handover control operation step; that is, determines a connection destination of the terminal 1 of interest. Then, the macro cell base station 2 transmits connection destination information regarding one of the base stations 2 to 5 determined as the connection destination to the terminal 1.

If a result of the communication quality measurement does not meet the condition for reporting the measurement result, the terminal 1 does not transmit a measurement report message to the macro cell base station 2, which means that a handover control operation is not performed.

Figure 3:
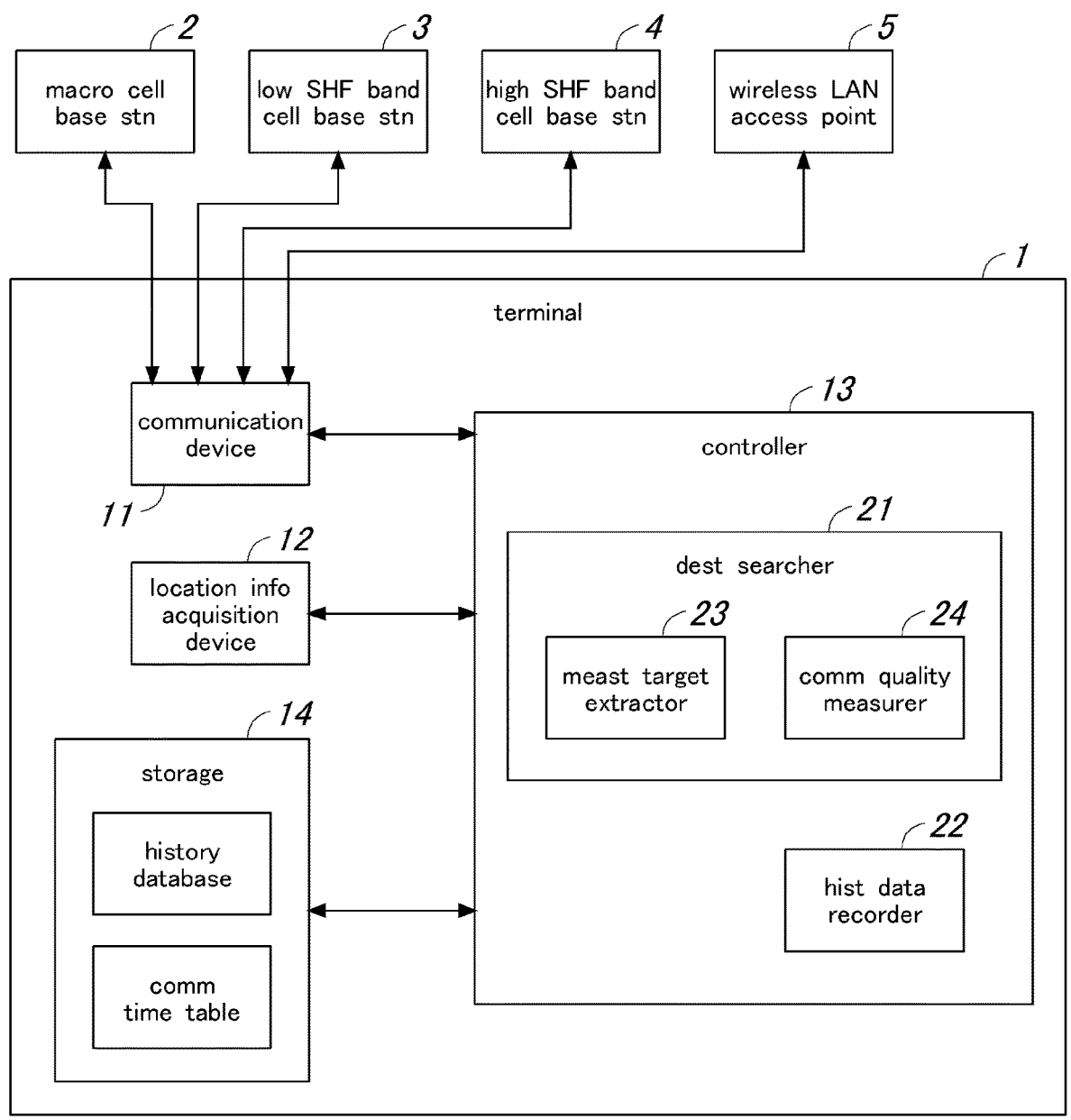
FIG. 3 is a block diagram showing a general configuration of the terminal 1.

Next, a general configuration of a terminal 1 will be described. FIG. 3 is a block diagram showing the general configuration of the terminal 1.

The terminal 1 includes a communication device 11, a location information acquisition device 12, a controller 13, and a storage 14.

The communication device 11 can communicate with the macro cell base station 2, the low SHF band base station 3, the high SHF band base station 4, and the wireless LAN base station 5 (access point).

The location information acquisition device 12 acquires location information including a location of the terminal 1 by using a satellite positioning system such as a GPS (Global Positioning System).

The storage 14 stores a piece of information (data sets) registered into the history database which the controller 13 manages, a piece of information (data sets) included in a communication time table which the controller uses, programs which the controller 13 executes, and other types of information.

The controller 13 includes a destination searcher 21 and a history data recorder 22. The controller 13 is implemented by the processor, and each part of the controller 13 is implemented by causing the processor to execute a corresponding program stored in the storage 14.

The destination searcher 21 is configured to search for an optimal connection destination, and includes a measurement target extractor 23 and a communication quality measurer 24.

The measurement target extractor 23 acquires history information regarding the mesh element area in which the terminal 1 is currently located, and extracts one or more connection destinations as targets of communication quality measurement based on the acquired history information.

The communication quality measurer 24 measures communication quality levels of communications with the connection destination candidates extracted by the measurement target extractor 23 as targets for communication quality measurement. In the present embodiment, the communication quality measurer measures an SINR (Signal to Interference plus Noise power Ratio) as a communication quality level for a target of communication quality measurement.

The history data recorder 22 acquires information on current communication status (connection destination information and communication quality information) at a time when the terminal 1 is located in each mesh element area, and records the acquired information into the history database as history information for the mesh element area. By periodically performing the recordation of history information, the terminal 1 can record history information for all the mesh element areas which the terminal 1 passes through into the history database.

Next, the history database used by the measurement target extractor 23 according to the first embodiment of the present invention will be described. FIG. 4 is an explanatory view showing an example for illustrating data sets recorded in the history database.

In the present embodiment, the measurement target extractor 23 acquires, from the history database stored in the storage 14, history data for a mesh element area in which the terminal 1 is currently located, and, based on the acquired history information for the mesh element area, extracts one or more connection destinations as targets of communication quality measurement.

This history database includes mesh IDs recorded with a time interval of e.g. one second (time), as wells as connection destination information and communication quality information for respective mesh IDs. Each mesh ID represents a mesh element area in which the terminal is located at a corresponding time. The connection destination information indicates a piece of information on each connection destination recorded at a corresponding time, which includes a connection destination identifier, a frequency, and a communication method. The communication quality information indicates a result of communication quality measurement at each time, which includes a reception power, a throughput, and a communication data amount.

A mesh ID is an identification number assigned to each mesh element area. In addition, a connection destination identifier is identification information for each of the base stations 2 to 5 used as a connection destination. For example, in cases of cellular communication methods, a cell ID is often used as a connection destination identifier, and in cases of wireless LANs, an SSID is often used as a connection destination identifier.

The history database may additionally include location information (a latitude, a longitude and an altitude) of the terminal 1 for each recordation. The types of communication quality information, which are not limited to the set of a reception power, a throughput and a communication data amount, may include an interference amount, a cutting rate, an error rate, a connection rate or other parameters for each recordation.

In other cases, the terminal 1 may record history information into the history database for each time period of day. By adopting this configuration, in cases where an optimal connection destination can vary depending on the time of day, the terminal device can makes a connection with an optimal connection destination for each time of day.

For sections where the terminal 1 has not passed through in the past, the terminal has no history information on mesh element areas in the sections because of a lack of record of communications therein. In this case, the terminals may use data obtained by interpolating pieces of history information for mesh element areas located around such no-record mesh element areas.

The terminal 1 may share the history database with another terminal 1. For example, the terminals 1 may upload respective history information to a server, which integrates them into an integrated piece of history information, and distributes the integrated piece of history information to the respective terminals 1. This configuration enables a terminal 1 to use history information on a mesh element area in a place where the terminal 1 has not located in the past. In other embodiments, when located in a no-record section, the terminal 1 may perform a measurement operation in a conventional manner (measuring all the connection destination candidates) and accumulate history information in the storage.

Next, processing operations performed by the measurement target extractor 23 according to the first embodiment will be described. FIG. 5 is an explanatory view showing an outline of processing operations performed by the measurement target extractor 23 in the present embodiment.

The terminal 1 recognizes a mesh element area in which the terminal 1 is currently located. Thus, the measurement target extractor 23 refers to a mesh ID in the history database (See FIG. 4) to extract history information for the mesh element area in which the terminal is currently located, and then acquires, based on the extracted history information, a communication time for each connection destination (the time period the terminal was present in its coverage area) as shown in FIG. 5A. In other words, the terminal acquires a time period in which the terminal continuously performed communication with a connection destination in the past as a communication time for the connection destination.

In the examples shown in FIG. 5, the current connection destination is a cell with a connection destination identifier of "123" as shown in FIG. 5B. Moreover, FIG. 5A shows that history information stored in the terminal 1 includes two identifiers of "101" and "123" for the same mesh element area (mesh ID 16097) in which the terminal 1 is currently located. The history database includes data sets recorded with a time interval of one second (time). In the history database (See FIG. 4), a communication time for one of the connection destinations in FIG. 5 (ID: 101) is two (2) seconds and that for the other (ID: 123) is one (1) second.

As shown in FIG. 5C, the measurement target extractor 23 calculates an expected communication time for each connection destination from the communication time therefor.

When a connection destination is not one with which the terminal is currently in communication; that is, one which requires a handover in order for the terminal to start communication therewith, the measurement target extractor 23 calculates an expected communication time therefor based on a preset handover cost for the connection destination and a communication time therefor acquired from history information for a mesh element area in which the terminal 1 is currently located. A handover cost is preset for each connection destination as a handover-related parameter and corresponds to a load on a terminal 1 or the base station 2 during a handover. That is, the measurement target extractor 23 calculates an expected communication time by correcting a communication time with a handover cost.

More specifically, the measurement target extractor 23 calculates an expected communication time for each connection destination by subtracting a handover cost from a communication time acquired from history information as the following formula:

Expected communication time=Communication time−Handover cost.

For the connection destination with which the terminal is currently in communication, a handover cost is "0."

In the example shown in FIG. 5C, for a connection destination with which the terminal is not currently in communication, a handover cost is set to be 0.5 s. Thus, for the current connection destination (ID: 123), an expected communication time is calculated as 1 s−0 s=1 s. For a different connection destination (ID: 101), an expected communication time is calculated as 2 s−0.5 s=1.5 s.

Thus, when a connection destination is one with which the terminal is not currently in communication; that is, one which requires a handover in order for the terminal to start communication therewith, an expected communication time becomes short, which means that, for a connection destination which requires a handover in order to start communication therewith, an evaluation of the connection destination is lowered.

Next, a communication time table to which the measurement target extractor 23 refers according to the first embodiment of the present invention will be described. FIG. 6 is an explanatory view showing an example of a communication time table.

The measurement target extractor 23 acquires a required communication time for an application currently performing communication based on the communication time table stored in the storage 14.

Data sets registered in the communication time table include a required communication time for each type of application. In the example shown in FIG. 6, the table includes respective required communication times for VoLTE call applications, video distribution applications, talk (chat) applications, VoIP call applications, map distribution applications, route assistance applications, and game applications. Although, in this example, the table includes a required communication time for each type of application, the table may include a required communication time for a unique ID such as a unique slice ID for each individual application.

Since a required communication time for an application greatly varies depending on how a user uses the application, the communication time table may be updated according to the user's usage of the application.

Figure 7:
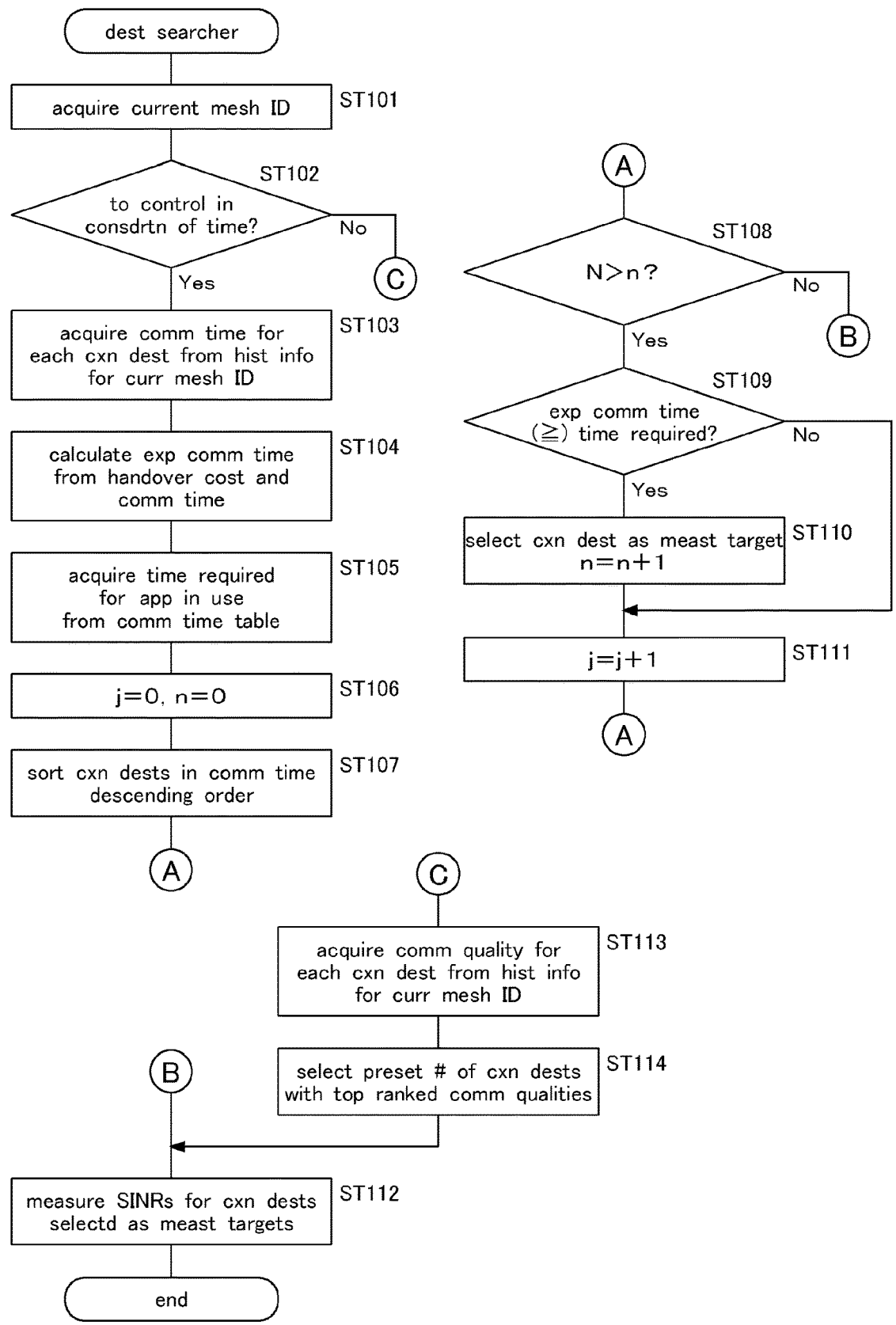
FIG. 7 is a flowchart showing a processing operation procedure performed by a destination searcher 21 according to the first embodiment of the present invention.

Next, a processing operation procedure performed by the destination searcher 21 according to the first embodiment of the present invention will be described. FIG. 7 is a flowchart showing a processing operation procedure performed by the destination searcher 21. The processing operation procedure is performed, both when the terminal receives (downloads) data and when the terminal transmits (uploads) data.

First, the destination searcher 21 acquires a mesh ID for a mesh element area in which the terminal 1 is currently located based on the location information including the current location of the terminal 1 (current location information) and acquired from the location information acquisition device 12 (ST101). Next, the destination searcher 21 determines whether or not to perform control in consideration of a communication time (ST102). The destination searcher 21 is preferably configured such that a user presets whether or not to perform control in consideration of a communication time. Alternatively, the destination searcher 21 may be configured to or set to perform control in consideration of a communication time when a remaining battery level becomes equal to or less than a threshold value.

Then, when performing control in consideration of a communication time (Yes in ST102), the destination searcher 21 extracts history information for the mesh ID corresponding to the current location of the terminal 1 from the history database, and then the destination searcher 21 acquires, based on the extracted history information, a communication time (the time period the terminal was present in the coverage area) for each connection destination (ST103). Next, the destination searcher 21 calculates an expected communication time for each connection destination based on the communication time and a handover cost therefor (ST104).

The destination searcher 21 acquires a required communication time for an application currently performing communication based on the communication time table stored in the storage 14 (ST105).

Next, the destination searcher 21 initializes the connection destination number j and the selected connection destination number n (ST106). Then, the destination searcher 21 sorts the connection destinations in descending order of the expected communication times, and then sequentially assigns connection destination numbers j to the sorted connection destinations (ST107).

Next, the destination searcher 21 determines whether or not the number of connection destinations already selected as measurement targets (the number of selected connection destinations n) is smaller than the maximum number of targets of communication quality measurement (the number of extracted measurement targets N) (ST108). The number of extracted measurement targets N may be preset in the terminal 1. Alternatively, the number of extracted measurement targets N may vary according to the remaining battery level of the terminal such that, when the remaining battery level is low, the number of extracted measurement targets N is set to be small value. If the number of selected connection destinations n is smaller than the number of extracted measurement targets N (Yes in ST108), then the destination searcher 21 determines whether or not the expected communication time for the connection destination number j (where the first one is the connection destination with the longest expected communication time) is longer than the required communication time (ST109).

If the expected communication time is equal to or longer than the required communication time (Yes in ST109), the destination searcher 21 selects the connection destination as a target of measurement, and increments the number of selected connection destinations n by one (ST110). Then, the destination searcher 21 increments the connection destination number j by one (ST111). Then, the process returns to ST108, and the destination searcher 21 performs the determination process on the next connection destination. Although not shown in the figure, when the incremented connection destination number j reaches the number of all the connection destinations sorted in the order of the expected communication times, the process proceeds to ST112 even though the number of selected connection destinations n does not reach the number of extracted measurement targets N.

If the expected communication time is shorter than the required communication time (Yes in ST109), the destination searcher 21 does not select the connection destination j as a target of measurement, and increments the number of selected connection destinations n by one (ST111). Then, the process returns to ST108, and the destination searcher 21 performs the determination process on the next connection destination.

Then, when the number of selected connection destinations n reaches the number of extracted measurement targets N (No in ST108), the destination searcher 21 measures SINRs of communications with the connection destinations selected as targets of communication quality measurement (ST112).

When not performing control in consideration of the communication time (No in ST102), the destination searcher 21 extracts history information for a mesh ID of a mesh element area in which the terminal 1 is currently located from the history database, and acquires communication quality level of communication with each connection destination based on the extracted history information (ST113). Then, the destination searcher 21 sorts the connection destinations in descending order of the communication quality levels, and then selects a prescribed number (the number of extracted measurement targets N) of communication destinations in descending order from the one with the highest communication quality level as targets of communication quality measurement (ST114). Then, the destination searcher 21 measures SINRs of communications with the connection destinations selected as targets of communication quality measurement (ST112).

In this way, in the present embodiment, since the connection destinations as targets of measurement are selected in descending order of the communication times, the targets of measurement can be narrowed down to connection destinations for which past communication times are relatively long, thereby reducing occurrence of short breaks in communication caused by handovers.

In the present embodiment, the destination searcher 21 is configured to acquire a communication time for each connection destination based on the history information, to correct the communication time with the handover cost therefor to obtain an expected communication time therefor, and to select the connection destination as a target of communication quality measurement when the expected communication time is longer than the required communication time for an application currently performing communication. However, the destination searcher 21 may be configured to select the connection destination as a target of communication quality level without correcting the communication time with the handover cost therefor. Alternatively, the destination searcher 21 may be configured to select a prescribed number (the number of extracted measurement targets N) of communication destinations in descending order from the one with the longest communication time as targets of communication quality measurement without comparison between the expected communication time and the required communication time for an application currently performing communication.

In the present embodiment, the destination searcher 21 is configured to acquire a communication time for each connection destination based on the history information, and to extract communication destinations as targets of communication quality measurement based on the acquired communication times. However, the destination searcher 21 may be configured to acquire a communication time and a communication quality level (such as reception power) for each connection destination based on the history information, and to extract communication destinations as targets of communication quality measurement based on both the acquired communication times and the communication quality levels.

Figure 8:
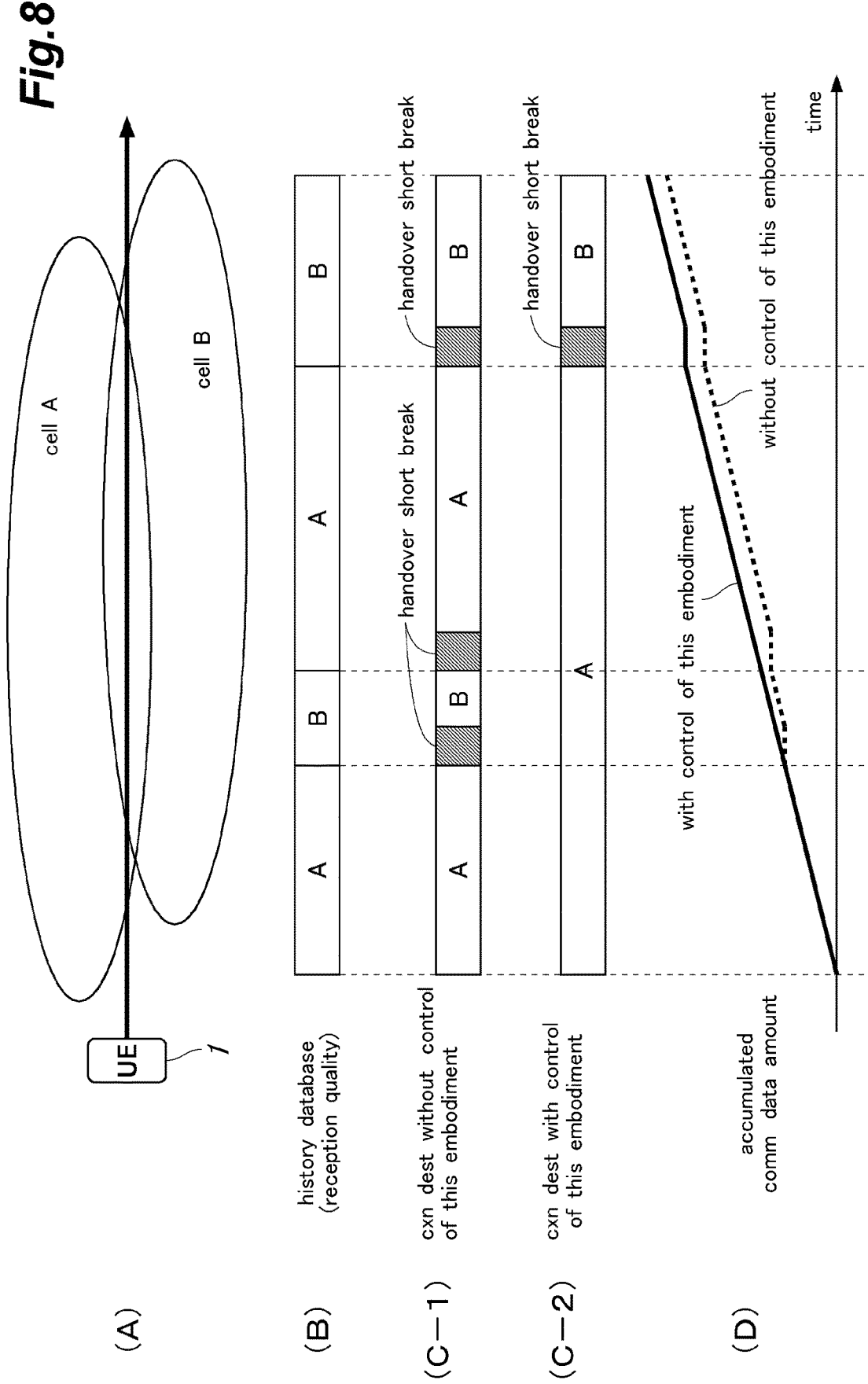
FIG. 8 is an explanatory view showing examples for illustrating effects achieved by the connection destination search operation according to the first embodiment of the present invention.

Next, effects achieved by the connection destination search operation according to the first embodiment of the present invention will be described. FIG. 8 is an explanatory view showing examples for illustrating effects achieved by the connection destination search operation.

In this example, as shown in FIG. 8A, two cells A and B are adjacent to each other and both perform wireless communication using a high SHF band or an EHF band (millimeter wave band), which implements a 5G NR (New Radio) technology. Therefore, one of the two cells A and B is selected as a connection destination depending on how the terminal 1 moves.

FIG. 8B shows a case where the connection destination with history information indicating a better communication quality level frequently changes from cell A, to cell B, to cell A, and to cell B. In this case, if control operations of the present embodiment are not performed (that is, targets of measurements are extracted based only on communication quality levels included in the history information) as shown in FIG. 8C-1, short breaks in communication caused by handovers frequently occur.

However, as shown in FIG. 8C-2, when the control operations of the present embodiment are performed, occurrence of unnecessary handovers is minimized so that short breaks in communication caused by handovers less frequently occur.

As shown in FIG. 8D, when the control operations of the present embodiment are performed, occurrence of unnecessary handovers is minimized, resulting in an increase in an accumulated communication data amount compared to the case where the control operations of the present embodiment are not performed.

In the present embodiment, the connection destinations as targets of communication quality measurement are extracted in consideration of communication times in the history information. However, the connection destinations as targets of communication quality measurement may be extracted in consideration of communication quality levels, in addition to communication times, in the history information.

Second Embodiment

Next, a second embodiment of the present invention will be described. Except for what will be discussed here, this embodiment is the same as the above-described embodiment.

In the first embodiment of the present invention, the connection destinations as targets of communication quality measurement are extracted in consideration of respective communication times for connection destination candidates in the history information (the time periods the terminal was present in their coverage areas). However, in the present embodiment, the connection destinations as targets of communication quality measurement are extracted in consideration of moving speeds of the terminal 1 in addition to communication times in the history information.

Next, a history database to which a measurement target extractor 23 refers according to the second embodiment of the present invention will be described. FIG. 9 is an explanatory view showing an example for illustrating data sets recorded in history database.

In the present embodiment, the history database includes mesh IDs recorded with a time interval of e.g. one second (time), as wells as moving speeds, connection destination information and communication quality information for respective mesh IDs. Mesh IDs, connection destination information, and communication quality information are the same as those described earlier with reference to the first embodiment (See FIG. 4). Each moving speed represents that of the terminal 1 at a corresponding time. The moving speed can be calculated from the location information acquired by the location information acquisition device 12.

Next, processing operations performed by the measurement target extractor 23 according to the second embodiment of the present invention will be described. FIG. 10 is an explanatory view showing an outline of processing operations performed by the measurement target extractor 23.

Like the first embodiment (See FIG. 5), in the examples shown in FIG. 10, the current connection destination is a cell with a connection destination identifier of "123" as shown in FIG. 10B. Moreover, FIG. 10A shows that history information stored in the terminal 1 includes two identifiers of "101" and "123" for the same mesh element area (mesh ID 16097) in which the terminal 1 is currently located. Since the history database includes data sets recorded with a time interval of one second (time) (See FIG. 9). The data sets in the database show that a communication time for one of the connection destinations in FIG. 5 (ID: 101) is two seconds, and that for the other one (ID: 123) is one second.

In the present embodiment, the terminal 1 acquires, from the history database, a moving speed for each connection destination in addition to a communication time therefor. Then, as shown in FIG. 10C, the measurement target extractor 23 calculates an expected communication time for each connection destination from the communication time and the moving speed therefor. When there are different moving speeds for one connection destination, the measurement target extractor 23 may acquire an average of the moving speeds, the latest moving speed, or the moving speed which is closest to the current moving speed of the terminal 1.

The communication quality level decreases with an increase in the moving speed of the terminal 1. Thus, when the moving speed in the history information is lower than the current moving speed of the terminal, an evaluation of a connection destination needs to be decreased.

In this light, in the present embodiment, for a connection destination with which the terminal is not currently in communication, the measurement target extractor 23 calculates a speed factor that is the ratio of the past moving speed acquired from the history information to the current moving speed (Past moving speed/Current moving speed), and then calculates an expected communication time by subtracting a corresponding handover cost from a communication time, and then multiplying the resulting value by the speed factor as the following formula:

Expected communication time=(Communication time−Handover cost)×Speed factor.

As in the above-described embodiment, for the connection destination with which the terminal is currently in communication, a handover cost is "0." For a connection destination with which the terminal is not currently in communication, a handover cost is "0.5." In addition, for a connection destination with which the terminal is not currently in communication, a speed factor is "1" because the past moving speed is the same as the current moving speed.

In the example shown in FIG. 10A, for the current connection destination (ID: 123), the moving speed is 10 km/h, and for a different connection destination (ID: 101), the moving speed is 5 km/h. Thus, as shown in FIG. 10, for the current connection destination (ID: 123), an expected communication time is calculated as (1 s−0 s)×(10/10)=1 s. For the different connection destination (ID: 101), an expected communication time is calculated as (2 s−0.5 s)×(5/10)=0.75 s.

Thus, when the past moving speed is lower than the current moving speed, an expected communication time becomes short, which means that, for a connection destination for which the past moving speed is lower than the current moving speed, an evaluation of the connection destination is lowered.

Figure 11:
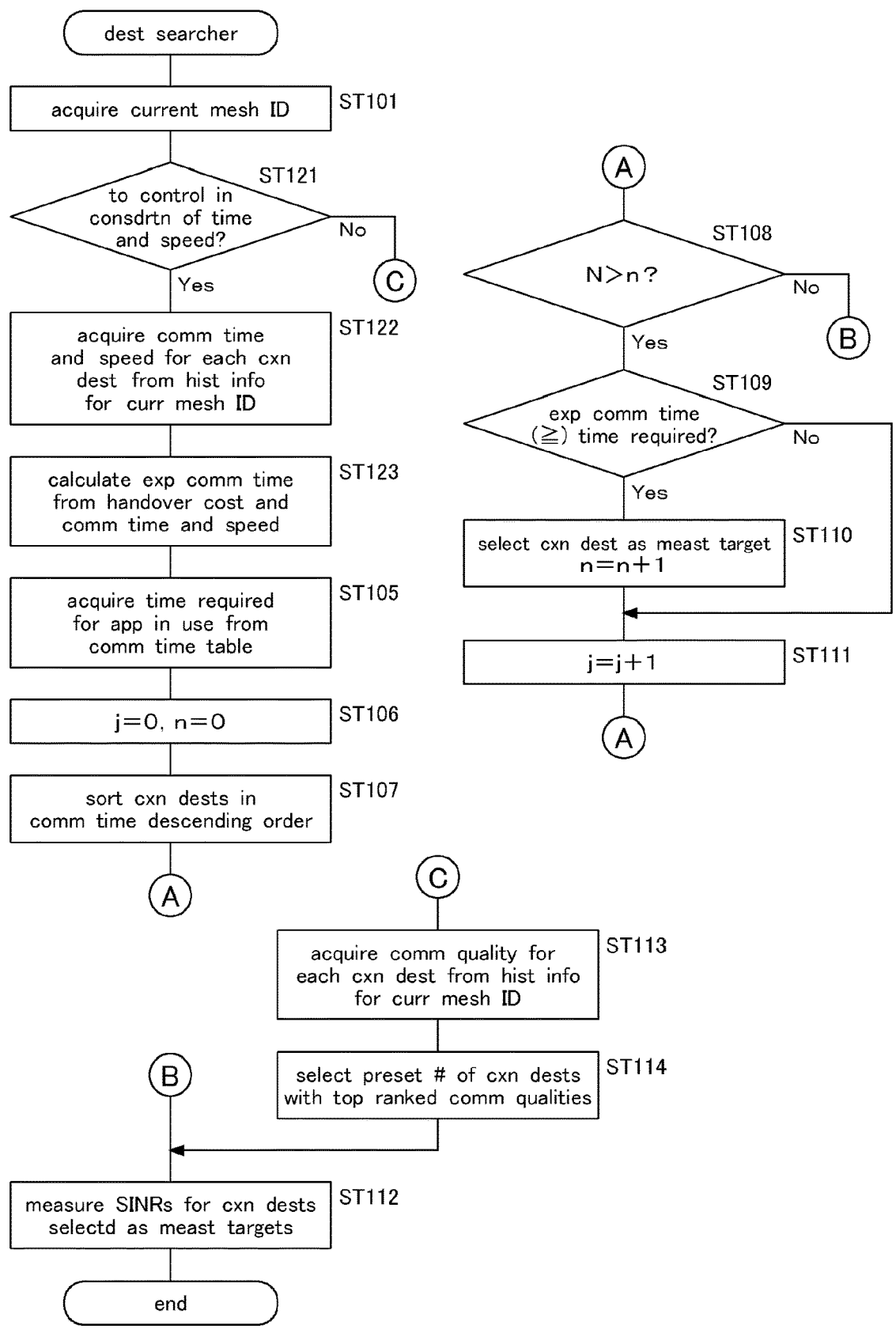
FIG. 11 is a flowchart showing a processing operation procedure performed by a destination searcher 21 according to the second embodiment of the present invention.

Next, a processing operation procedure performed by a destination searcher 21 according to the second embodiment of the present invention will be described. FIG. 11 is a flowchart showing a processing operation procedure performed by the destination searcher 21. The processing operation procedure is performed, both when the terminal receives (downloads) data and when the terminal transmits (uploads) data.

First, the destination searcher 21 acquires a mesh ID for a mesh element area in which the terminal 1 is currently located based on the location information including the current location of the terminal 1 and acquired from the location information acquisition device 12 (ST101). Next, the destination searcher 21 determines whether or not to perform control in consideration of a communication time and a moving speed (ST121).

Then, when performing control in consideration of a communication time and a moving speed (Yes in ST102), the destination searcher 21 extracts history information for the mesh ID corresponding to the current location of the terminal 1 from the history database, and then the destination searcher 21 acquires, based on the extracted history information, a communication time (the time period the terminal was present in the coverage area) and a moving speed for each connection destination (ST122). Next, the destination searcher 21 calculates an expected communication time for each connection destination based on the communication time, the handover cost, and the moving speed therefor (ST123).

The subsequent steps are the same as in the first embodiment (See FIG. 7).

Third Embodiment

Next, a third embodiment of the present invention will be described. Except for what will be discussed here, this embodiment is the same as the above-described embodiments.

In the first embodiment of the present invention, the connection destinations as targets of communication quality measurement are extracted in consideration of respective communication times for connection destination candidates in the history information. However, in the present embodiment, the connection destinations as targets of communication quality measurement are extracted in consideration of respective current consumptions for connection destination candidates in the history information.

Figure 12:
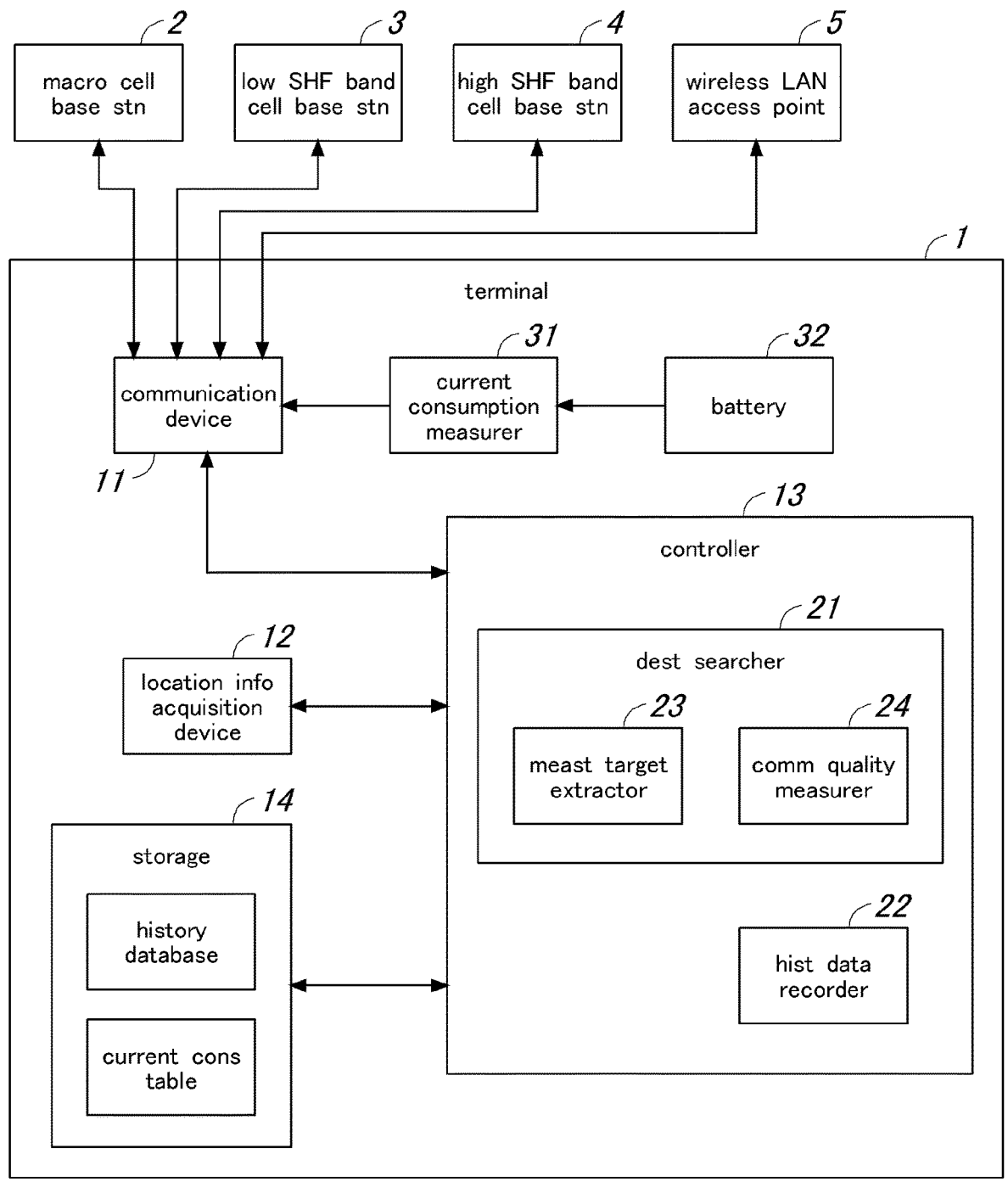
FIG. 12 is a block diagram showing a general configuration of a terminal 1 according to a third embodiment of the present invention.

Next, a general configuration of a terminal 1 according to the third embodiment of the present invention will be described. FIG. 12 is a block diagram showing a general configuration of the terminal 1 according to the third embodiment.

The configuration of the terminal 1 is similar to that of the first embodiment (See FIG. 3). However, the terminal 1 of the third embodiments includes a current consumption measurer 31. The current consumption measurer 31 measures a current supplied from a battery 32 to the communication device 11.

In the present embodiment, the current consumption measurer 31 measures a current supplied from the battery 32 to the communication device 11. However, the current consumption measurer 31 may measure a current consumption based on a change in the remaining power of the battery 32. Alternatively, the terminal 1 may be configured to measure a power consumption instead of a current consumption.

Next, a history database to which a measurement target extractor 23 refers in the third embodiment of the present invention will be described. FIG. 13 is an explanatory view showing an example for illustrating data sets recorded in the history database.

In the present embodiment, the history database includes mesh IDs recorded with a time interval of e.g. one second (time), as wells as current consumptions, connection destination information and communication quality information for respective mesh IDs. Mesh IDs, the connection destination information, and the communication quality information are the same as those in the first embodiment (See FIG. 4). Each current consumption is one measured by the current consumption measurer 31 at a corresponding time.

Next, processing operations performed by the measurement target extractor 23 according to the third embodiment will be described. FIG. 14 is an explanatory view showing an outline of processing operations performed by the measurement target extractor 23.

Like the above embodiment, in the examples shown in FIG. 14, the current connection destination is a cell with a connection destination identifier of "123" as shown in FIG. 14B. Moreover, FIG. 14A shows that history information stored in the terminal 1 includes two identifiers of "101" and "123" for the same mesh element area (mesh ID 16097) in which the terminal 1 is currently located. In the history database (See FIG. 13), current consumptions for one of the connection destinations (ID: 101) are 500 and 400 and that for the other connection destination (ID: 123) is 200.

In the present embodiment, the measurement target extractor 23 extracts history information for a mesh element area in which the terminal is currently located, and then acquires, based on the extracted history information, a current consumption for each connection destination as shown in FIG. 14A. When there are different current consumptions for one connection destination, the measurement target extractor 23 may acquire an average of the current consumptions. In this case, since there are two current consumptions of 500 and 400 for the connection destination (ID: 101), a current consumption for the connection destination is set to be 450. Then, as shown in FIG. 14C, the measurement target extractor 23 calculates an expected current consumption for each connection destination (a current which the terminal 1 is expected to consume when connecting the connection destination) from the current consumption therefor.

More specifically, the measurement target extractor 23 calculates an expected current consumption for each connection destination by multiplying a handover cost by a constant, and then adding the resulting value to a current consumption acquired from history information as the following formula:

Expected current consumption=Current consumption+(Constant×Handover cost).

As in the above-described embodiments, for the connection destination with which the terminal is currently in communication, a handover cost is "0." For a connection destination with which the terminal is not currently in communication, a handover cost is "0.5." Alternatively, an optimal handover cost may be determined for a current consumption by conducting a simulation.

In the example shown in FIG. 14C, a constant to be multiplied to a handover cost is set to be 100. Thus, for the current connection destination (ID: 123), an expected current consumption is calculated as 200+(100×0)=200 mA. Accordingly, the expected current consumption for the current connection destination is equal to the current consumption in the history information. For the different connection destination (ID: 101), an expected current consumption is calculated as 450+(100×0.5)=500 mA. Accordingly, the expected current consumption for the connection destination is greater than the current consumption in the history information.

Thus, when a connection destination is one with which the terminal is not currently in communication; that is, one which requires a handover in order for the terminal to start communication therewith, an expected current consumption becomes large, which means that, for a connection destination which requires a handover in order to start communication therewith, an evaluation of the connection destination is lowered.

Next, a current consumption table to which the measurement target extractor 23 refers according to the third embodiment of the present invention will be described. FIG. 15 is an explanatory view showing an example of a current consumption table.

In the present embodiment, the measurement target extractor 23 acquires a required current consumption for an application currently performing communication based on the current consumption table stored in the storage 14.

Data sets registered in the current consumption table include a required current consumption for each type of application. In the example shown in FIG. 15, the table includes respective required current consumptions for VoLTE call applications, video distribution applications, talk (chat) applications, VoIP call applications, map distribution applications, route assistance applications, a game applications. Although, in this example, the table includes a required current consumption for each type of application, the table may include a required current consumption for each ID information such as a unique slice ID for a corresponding application.

Since a required current consumption for each application greatly varies depending on how a user uses the application, the current consumption table may be updated according to the user's usage of the application.

Figure 16:
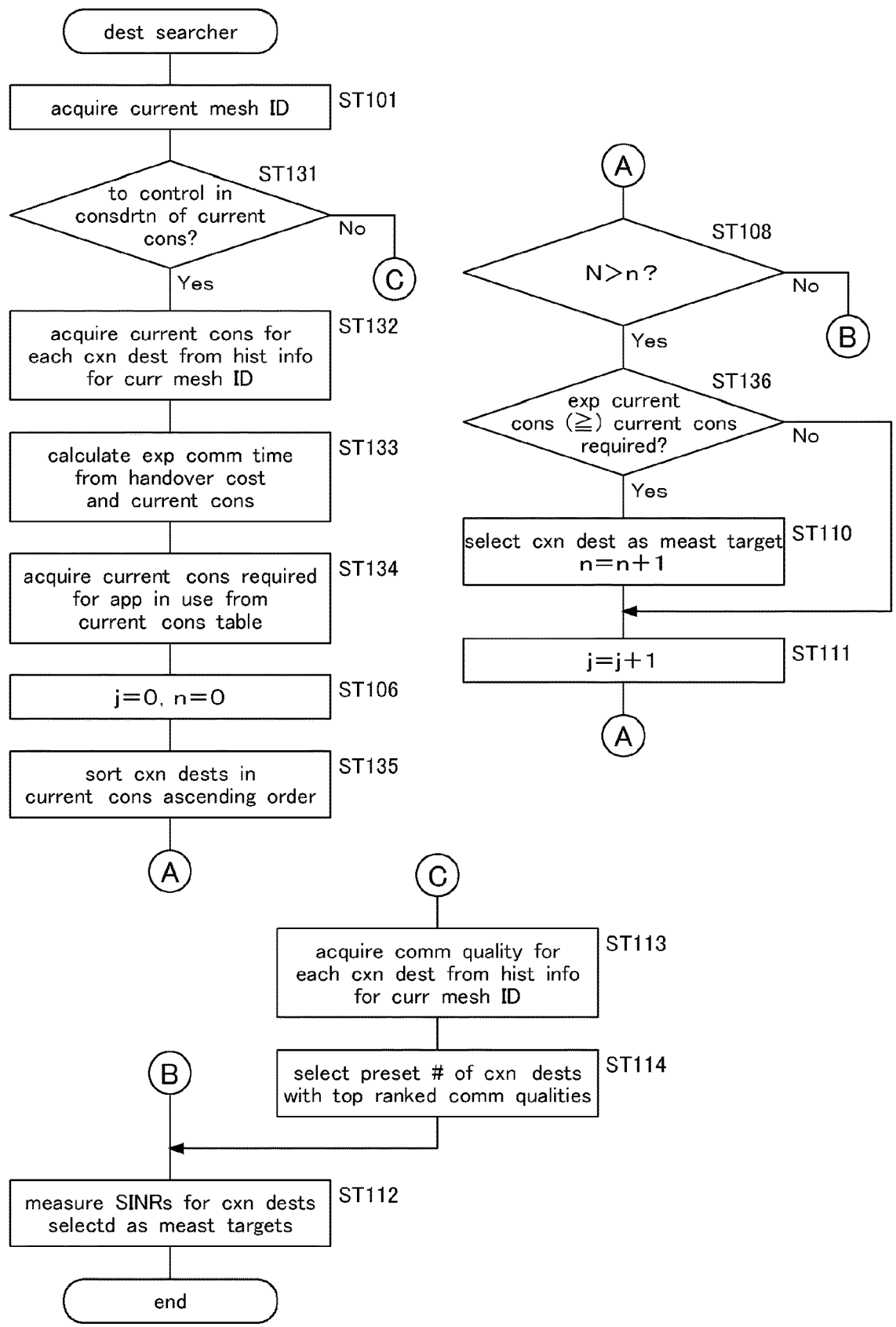
FIG. 16 is a flowchart showing a processing operation procedure performed by a destination searcher 21 according to the third embodiment of the present invention.

Next, a processing operation procedure performed by a destination searcher 21 according to the third embodiment of the present invention will be described. FIG. 16 is a flowchart showing a processing operation procedure performed by the destination searcher 21. The processing operation procedure is performed, when the terminal transmits (uploads) data.

First, the destination searcher 21 acquires a mesh ID for a mesh element area in which the terminal 1 is currently located based on the location information including the current location of the terminal 1 and acquired from the location information acquisition device 12 (ST101). Next, the destination searcher 21 determines whether or not to perform control in consideration of a current consumption (ST131).

Then, when performing control in consideration of a current consumption (Yes in ST131), the destination searcher 21 extracts history information for the mesh ID corresponding to the current location of the terminal 1 from the history database, and then the destination searcher 21 acquires, based on the extracted history information, a current consumption for each connection destination (ST132). Next, the destination searcher 21 calculates an expected current consumption for each connection destination based on the current consumption and a handover cost therefor (ST133).

The destination searcher 21 acquires a required current consumption for an application currently performing communication based on the current consumption table stored in the storage 14 (ST134).

Next, the destination searcher 21 initializes the connection destination number j and the selected connection destination number n (ST106). Then, the destination searcher 21 sorts the connection destinations in ascending order of the expected current consumptions, and then sequentially assigns connection destination numbers j to the sorted connection destinations (ST135).

Next, the destination searcher 21 determines whether or not the number of selected connection destinations n is smaller than the number of extracted measurement targets N (ST108). If the number of selected connection destinations n is smaller than the number of extracted measurement targets N (Yes in ST108), then the destination searcher 21 determines whether or not the expected current consumption for the connection destination number j (where the first one is the connection destination with the smallest expected current consumption) is greater than the required current consumption (ST136).

If the expected current consumption is equal to or greater than the required current consumption (Yes in ST136), the destination searcher 21 selects the connection destination as a target of measurement, and increments the number of selected connection destinations n by one (ST110). Then, the destination searcher 21 increments the connection destination number j by one (ST111). Then, the process returns to ST108, and the destination searcher 21 performs the determination process on the next connection destination.

If the expected current consumption is smaller than the required current consumption (Yes in ST136), the destination searcher 21 does not select the connection destination j as a target of measurement, and increments the number of selected connection destinations n by one (ST111). Then, the process returns to ST108, and the destination searcher 21 performs the determination process on the next connection destination.

The subsequent steps are the same as in the first embodiment (See FIG. 7).

In this way, in the present embodiment, since the connection destinations as targets of measurement are selected in ascending order of the current consumptions, the targets of measurement can be narrowed down to connection destinations for which current consumptions are relatively small, thereby reducing the power consumption of the terminal 1.

In the present embodiment, the destination searcher 21 is configured to acquire a current consumption for each connection destination based on the history information, and to extract the connection destination as a target of communication quality measurement based on the acquired current consumption. However, the destination searcher 21 may be configured to acquire a current consumption and a communication quality level (such as a reception power) for each connection destination, and extract connection destinations as targets of communication quality measurement based on both the acquired current consumptions and the communication quality levels.

Fourth Embodiment

Next, a fourth embodiment of the present invention will be described. Except for what will be discussed here, this embodiment is the same as the above-described embodiments.

In the third embodiment of the present invention, the connection destinations as targets of communication quality measurement are extracted in consideration of respective current consumptions for connection destination candidates in the history information. However, in the present embodiment, the connection destinations as targets of communication quality measurement are extracted in consideration of an application currently performing communication, in addition to current consumptions, in the history information.

Next, a history database to which a measurement target extractor 23 refers according to the fourth embodiment of the present invention will be described. FIG. 17 is an explanatory view showing an example for illustrating data sets recorded in history database.

In the present embodiment, this history database includes mesh IDs recorded with a time interval of e.g. one second (time), as wells as applications performing communication, connection destination information and communication quality information for respective mesh IDs. Mesh IDs, connection destination information, and communication quality information are the same as those described earlier with reference to the third embodiment (See FIG. 13). Each application performing communication represents an application ID of a type of application currently performing communication by using the communication device 11. Although, in the present embodiment, an application ID is determined an ID for each type of application, an application ID may be determined as a unique ID such as a unique slice ID for each individual application.

Next, processing operations performed by the measurement target extractor 23 according to the fourth embodiment of the present invention will be described. FIG. 18 is an explanatory view showing an outline of processing operations performed by the measurement target extractor 23.

Like the above embodiment, in the examples shown in FIG. 18, the current connection destination is a cell with a connection destination identifier of "123" as shown in FIG. 18B. Moreover, FIG. 18A shows that history information stored in the terminal 1 includes two identifiers of "101" and "123" for the same mesh element area (mesh ID 16097) in which the terminal 1 is currently located. In the history database (See FIG. 17), for one connection destination (ID: 101), there are two sets of history information, both including the same application ID of "A" for application performing communication. For the other connection destination (ID: 123), an application ID of "B" for application performing communication. In addition, current consumptions for one of the connection destinations (ID: 101) are 500 and 400 and a current consumption for the other connection destination (ID: 123) is 200.

In the present embodiment, the measurement target extractor 23 extracts history information for a mesh element area in which the terminal is currently located, and then acquires, based on the extracted history information, an application currently performing communication and a current consumption for each connection destination as shown in FIG. 18A. When there are different current consumptions for one connection destination, the measurement target extractor 23 may acquire an average of the current consumptions. In this case, since there are two current consumptions of 500 and 400 for the connection destination (ID: 101), a current consumption for the connection destination is set to be 450. Alternatively, the measurement target extractor 23 may acquire the latest current consumption. Then, as shown in FIG. 18C, the measurement target extractor 23 calculates an expected current consumption for each connection destination from the current consumption and the application currently performing communication therefor.

In the present embodiment, the measurement target extractor 23 calculates an application factor which is the ratio of the past current consumption acquired from the history information to the currently measured current consumption, both measured for an application currently performing communication (Past current consumption of the application in communication/Currently measured current consumption measured for the application currently performing communication), and then calculates an expected current consumption by multiplying a handover cost by a constant by the application factor, and then adding the resulting value to the past current consumption acquired from history information as the following formula:

Expected communication time=Past current consumption+(Constant×Handover cost)×Application factor.

In the example shown in FIG. 17, for the connection destination (ID: 123) with which the terminal is currently in communication, both a "past current consumption" and a "(currently measured) current consumption", which are required by an application currently performing communication, are "200", and for the connection destination (ID: 101) with which the terminal is not currently in communication, a "past current consumption" is an average current consumption of "450" and a "(currently measured) current consumption", which is required by an application currently performing communication, is "200." As in the above-described embodiment, for the connection destination with which the terminal is currently in communication, a handover cost is "0." and for a connection destination with which the terminal is not currently in communication, a handover cost is "0.5." A constant to be multiplied to a handover cost is set to be 100. In addition, for a connection destination with which the terminal is currently in communication, an application factor is "1" as described above.

In the examples in FIG. 18. FIG. 18B shows that the current connection destination is a cell with a connection destination identifier of "123" and that an application B is currently performing communication. FIG. 18A shows the history information for a mesh element area (mesh ID 16097) in which the terminal 1 is currently located, and the history information in FIG. 18A for the mesh element area indicates that an application A has performed communication with one connection destination (ID: 101), and that the application B is currently performing communication with the connection destination (ID: 123).

When a current consumption of 200 mA is measured for the application B, which is currently performing communication, and an average current consumption of 450 mA is set for the application A, an expected current consumption for the current communication destination (ID: 123) is calculated as 200+(100×0)×(200/200)=200 mA as shown in FIG. 18C. Accordingly, the expected current consumption for the current communication destination is equal to the current consumption in the history information. For the different connection destination (ID: 101), an expected current consumption is calculated as 450+(100×0.5)×(400/200)=550 mA. Accordingly, the expected current consumption for the connection destination is greater than the current consumption in the history information.

Figure 19:
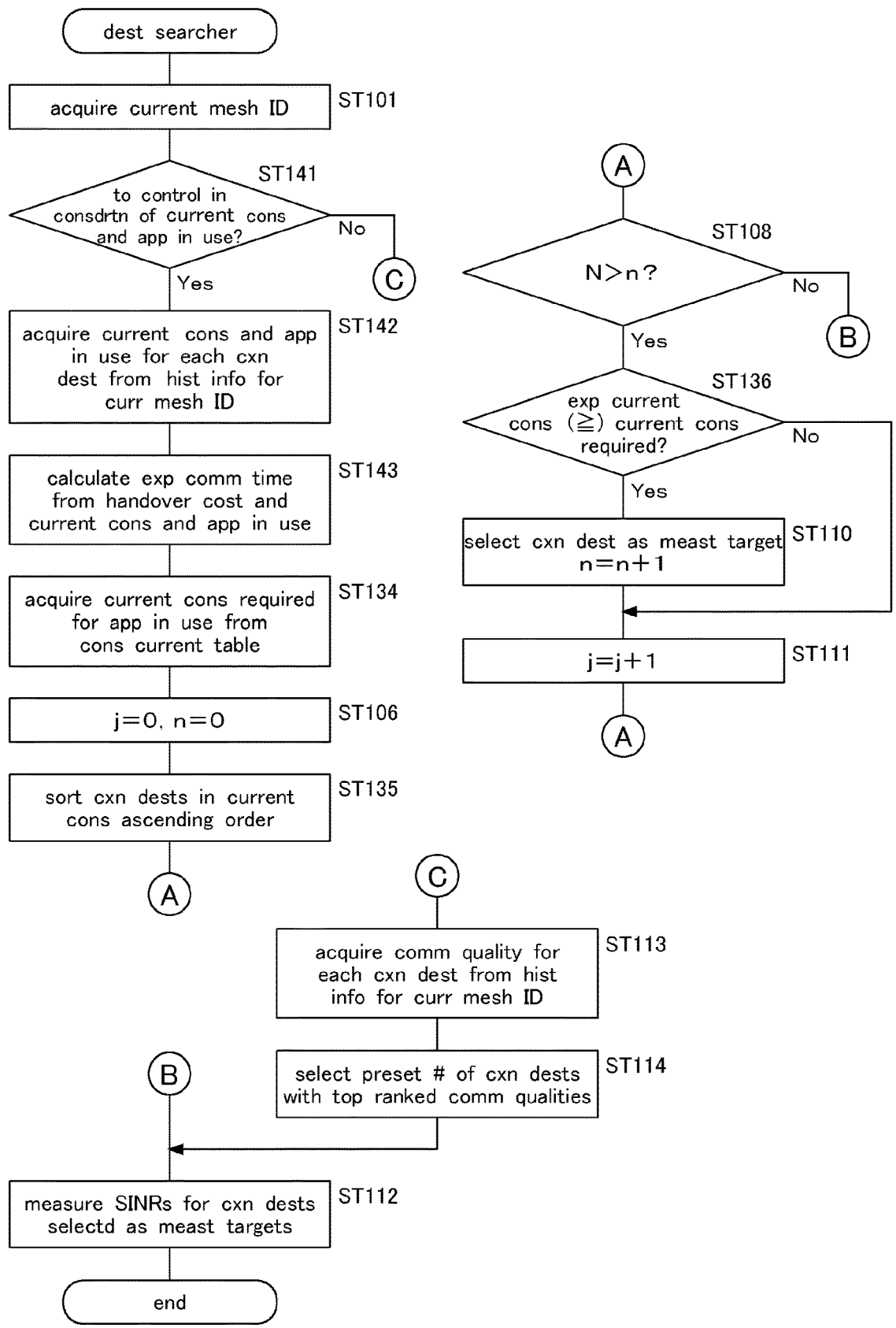
FIG. 19 is a flowchart showing a processing operation procedure performed by a destination searcher 21 according to the fourth embodiment of the present invention.

Next, a processing operation procedure performed by a destination searcher 21 according to the fourth embodiment of the present invention will be described. FIG. 19 is a flowchart showing a processing operation procedure performed by the destination searcher 21. The processing operation procedure is performed, when the terminal transmits (uploads) data.

First, the destination searcher 21 acquires a mesh ID for a mesh element area in which the terminal 1 is currently located based on the location information including the current location of the terminal 1 and acquired from the location information acquisition device 12 (ST101). Next, the destination searcher 21 determines whether or not to perform control in consideration of a current consumption and an application currently performing communication (ST141).

Then, when performing control in consideration of a current consumption and an application currently performing communication (Yes in ST141), the destination searcher 21 extracts history information for the mesh ID corresponding to the current location of the terminal 1 from the history database, and then the destination searcher 21 acquires, based on the extracted history information, a current consumption and an application currently performing communication for each connection destination (ST142). Next, the destination searcher 21 calculates an expected current consumption for each connection destination based on the current consumption, a handover cost, and the application currently performing communication therefor (ST143).

The subsequent steps are the same as in the first embodiment (See FIG. 7).

In this way, in the present embodiment, since the connection destinations as targets of communication quality measurement are selected in ascending order of the current consumptions for an application performing communication, the targets of communication quality measurement can be narrowed down to connection destinations for which current consumptions are relatively small, thereby reducing the power consumption of the terminal 1.

Fifth Embodiment

Next, a fifth embodiment of the present invention will be described. Except for what will be discussed here, this embodiment is the same as the above-described embodiments.

In the present embodiment, like the above-described embodiments, a destination searcher refers to history information for each mesh element area recorded in the history database, extracts connection destinations as targets of communication quality measurement, and measures the extracted connection destinations. However, in the above-described embodiments, in which a destination searcher is configured to refer to history information for a mesh element area in which the terminal 1 is currently located, three is a problem that the terminal can wastefully perform a connection destination search operation in cases where, although a destination searcher has referred to history information for a mesh element area for the connection destination search operation, the terminal 1 passes through the mesh element area before the completion of communication quality measurement.

In view of this problem, in the present embodiment, a terminal 1 is configured to estimate a moving state (moving speed and/or moving direction) of the terminal 1 based on the location information of the terminal 1, to predict a mesh element area as a destination (destination area) of the terminal 1 based on the estimated moving state, to extract connection destinations as targets of communication quality measurement bases on history information for the destination mesh element area, and to measure communication quality levels of communications with the extracted connection destinations.

This configuration enables a terminal to avoid wastefully performing a connection destination search operation and efficiently extract an optimal connection destination. Moreover, this configuration can increase a communication time for which a terminal can perform communication with a high-speed, high capacity cell, thereby improving a system's processing capacity.

Figure 20:
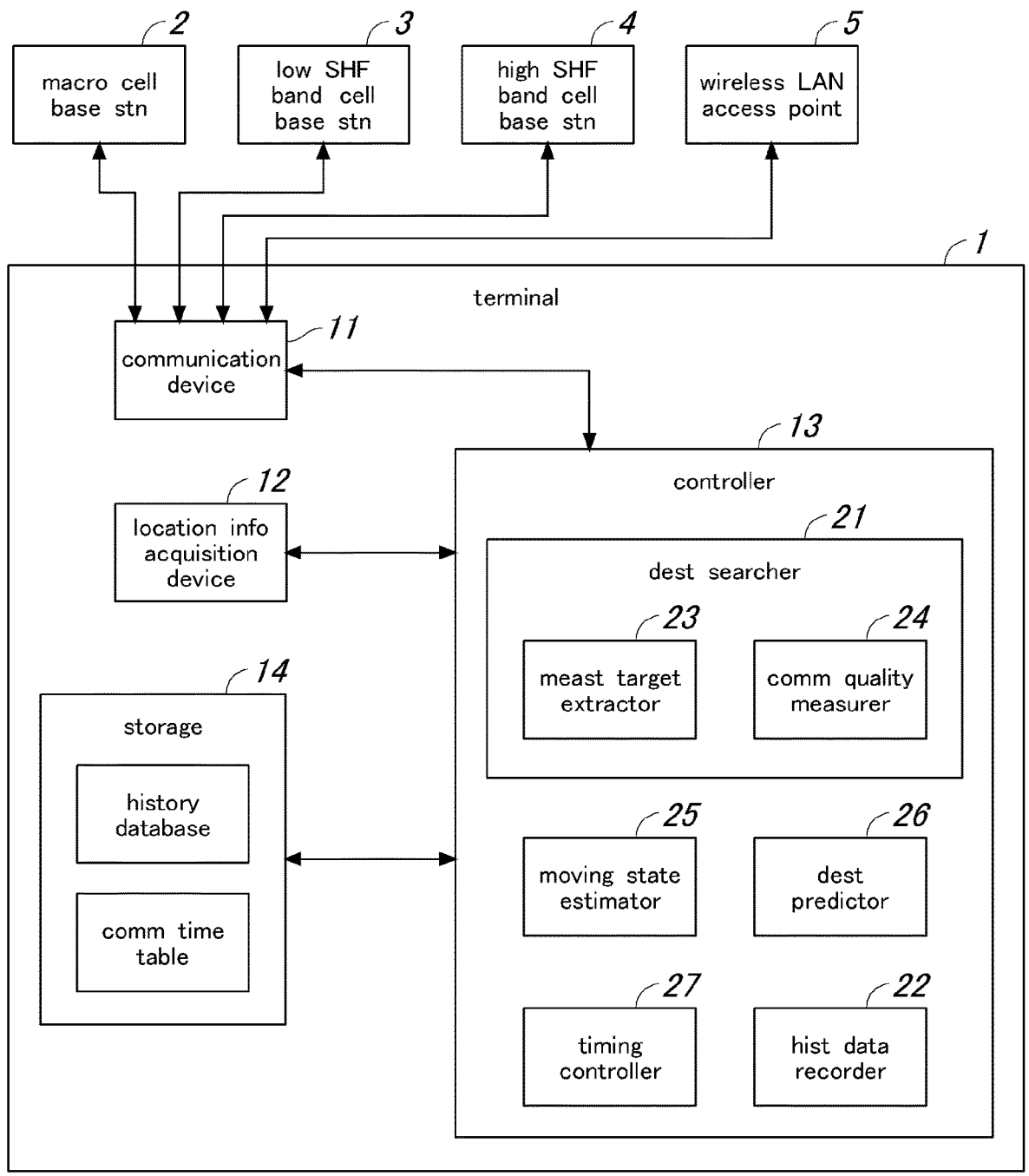
FIG. 20 is a block diagram showing a general configuration of a terminal 1 according to a fifth embodiment of the present invention.

Next, a general configuration of a terminal 1 according to a fifth embodiment of the present invention will be described. FIG. 20 is a block diagram showing a general configuration of the terminal 1.

The configuration of the terminal 1 is similar to that of the first embodiment (See FIG. 3), but different in that a controller of the terminal 1 of the present embodiment includes a moving state estimator 25, a destination predictor 26, and a timing controller, in addition to the destination searcher 21 and the history data recorder 22.

The moving state estimator 25 is configured to acquire location information including the current location of a terminal 1 from the location information acquisition device 12, to acquire past location information from the storage 14, and to estimate a moving speed and a moving direction of the terminal 1 as a current moving state of the terminal 1 based on the location information and the past location information. The moving state estimator may estimate a moving state from a latitude, a longitude and an altitude as the location information, or only from a latitude and a longitude on a horizontal plane. Alternatively, the moving state estimator may be configured to count the number of times of cell switching and/or cell reselection, and then estimate a moving state from the counted number of times.

The destination predictor 26 is configured to predict, based on the moving state (moving speed and moving direction) of a terminal 1 acquired by the moving state estimator 25, one or more target mesh element areas (destination areas), which the terminal 1 is expected to enter in the future.

The measurement target extractor 23 is configured to acquire history information for the target mesh element areas predicted by the destination predictor 26 from the history database in the storage 14, and to extract connection destinations as targets of communication quality measurement based on the acquired history information for the target mesh element areas.

The timing controller 27 is configured to determine a time (position) to start a connection destination search operation; that is the extraction of one or more targets for communication quality measurement, which is performed by the measurement target extractor, and a time to start communication quality measurement, which is performed by the communication quality measurer, based on a moving state (moving speed and moving direction) of a terminal 1 estimated by the moving state estimator 25 and also based on whether or not there is a difference between a frequency of the current connection destination and that of each connection destination candidate as a target for communication quality measurement. At the time to start the connection destination search operation, the timing controller 27 causes the measurement target extractor 23 to extract one or more targets for communication quality measurement, and subsequently causes the communication quality measurer 24 to perform the communication quality measurement.

Figure 21:
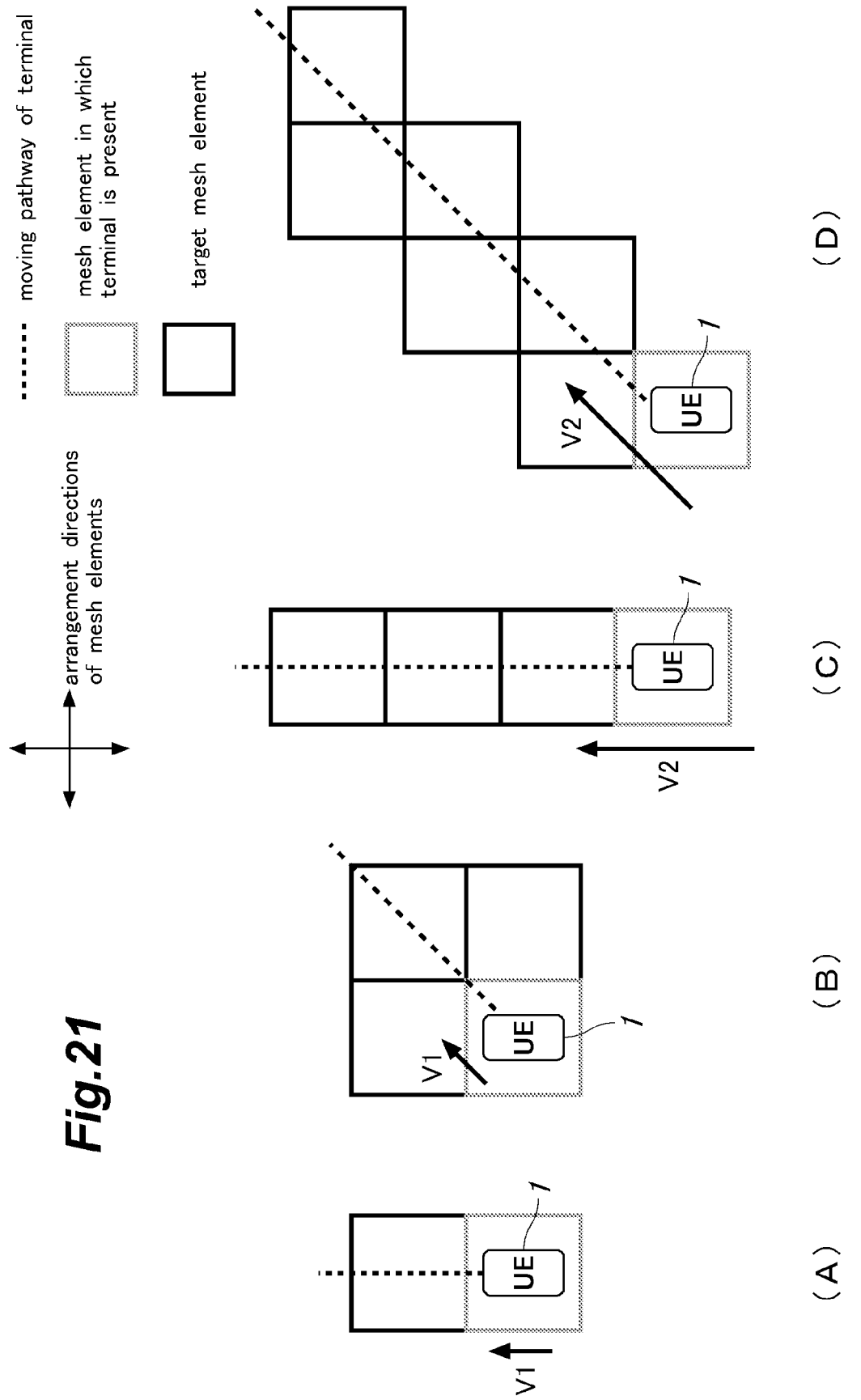
FIG. 21 is an explanatory view showing an outline of processing operations performed by a destination predictor 26 according to the fifth embodiment of the present invention.

Next, processing operations performed by the destination predictor 26 according to the fifth embodiment of the present invention will be described. FIG. 21 is an explanatory view showing an outline of processing operations performed by a destination predictor 26.

In the present embodiment, the destination predictor 26 predicts one or more target mesh element areas, which are to be future destination areas of a terminal 1, and by referring to history information for the predicted one or more target mesh element areas, the controller extracts connection destination candidates as targets for communication quality measurement, and measures communication quality levels of communications with the connection destination candidates.

In the present embodiment, the destination predictor 26 determines one or more target mesh element areas based on a moving speed and a moving direction of a terminal 1 acquired by the moving state estimator 25.

When that the moving speed of the terminal 1 is low, a mesh element area adjacent to the current mesh element area in which the terminal 1 is currently located is selected as a target mesh element area.

In the example shown in FIG. 21A, the moving speed of a terminal 1 is low and the terminal 1 moves in a mesh element area in a parallel direction relative to one of the arrangement directions of the mesh element areas (a direction parallel to one of the arrangement directions of the mesh element areas which are vertically and horizontally arranged). In this case, the terminal selects one mesh element area that is located in the moving direction of the terminal 1 and adjacent to the mesh element area in which the terminal 1 is currently located, which means the number of a target mesh element area is one (1). It should be noted that, although each mesh element area has a square shape in this example, the shape of a mesh element area may be a circle, an ellipse, or any other suitable shape.

In the example shown in FIG. 21B, the moving speed of a terminal 1 is low and the terminal 1 moves in a mesh element area in a diagonal (inclined) direction relative to one of the arrangement directions of the mesh element areas (a direction not parallel to one of the arrangement directions of the mesh element areas which are vertically and horizontally arranged). In this case, the terminal selects three mesh element areas that are located in the moving direction of the terminal 1 and adjacent to the mesh element area in which the terminal 1 is currently located, which means the number of target mesh element areas is three (3).

In cases where the moving speed of a terminal 1 is high, when the terminal selects only one or more mesh element areas that are adjacent to the mesh element area in which the terminal 1 is currently located, the terminal may pass through the selected mesh element areas before the connection destination search operation is completed. For this reason, the terminal also selects, in addition to the mesh element areas adjacent to the mesh element area in which the terminal 1 is currently located, one or more mesh element areas that are located ahead of the movement of the terminal in the moving direction.

In the example shown in FIG. 21C, the moving speed of a terminal 1 is high and the terminal 1 moves in a mesh element area in a parallel direction relative to one of the arrangement directions of the mesh element areas (a direction parallel to one of the arrangement directions of the mesh element areas which are vertically and horizontally arranged). In this case, the terminal selects three mesh element areas that are sequentially located ahead of the movement of the terminal 1 in the moving direction, which means the number of target mesh element areas is three (3).

In the example shown in FIG. 21D, the moving speed of a terminal 1 is high and the terminal 1 moves in a mesh element area in a diagonal (inclined) direction relative to one of the arrangement directions of the mesh element areas (a direction not parallel to one of the arrangement directions of the mesh element areas which are vertically and horizontally arranged). In this case, the terminal selects six mesh element areas that are sequentially located ahead of the movement of the terminal 1 in the moving direction, which means the number of target mesh element areas is six (6).

In the high-speed examples shown in FIGS. 21C and 21D, it is assumed that the moving speed V2 is three times as high as the low moving speed V1 shown in FIGS. 21A and 21B.

As described above, in the present embodiment, a terminal 1 selects, based on the moving speed and the moving direction of the terminal 1, one or more mesh element areas which the terminal is to enter in future as target mesh element areas, and then, by referring to the history information for the target mesh element areas, the terminal extracts connection destination candidates as targets for communication quality measurement.

When the moving speed of a terminal 1 is high, the terminal selects mesh element areas so as to make a destination area larger than that for the cases where the moving speed is low. In other words, the terminal sets a larger number of mesh element areas compared to the cases where the moving speed is low. As a result, when the moving speed is high, the terminal can start a connection destination search operation (measurement target extraction and communication quality measurement) at an earlier timing, and thus the terminal can avoid the terminal from passing through a destination area before the completion of the connection destination search operation, and thus wastefully performing the connection destination search operation.

In other embodiments, when the moving speed of a terminal 1 is high, the terminal may set each mesh element area larger than that for the cases where the moving speed is low. In this case, the history data recorder 22 changes the size of each mesh element area (See FIG. 29).

In the present embodiment, when a terminal 1 in a mesh element area moves, as shown in FIGS. 21B and 21D, in a diagonal (inclined) direction relative to one of the arrangement directions of the mesh element areas (a direction not parallel to one of the arrangement directions of the mesh element areas which are vertically and horizontally arranged), the terminal sets a larger number of mesh element areas compared to the cases where the terminal 1 in a mesh element area moves in a parallel direction relative to one of the arrangement directions of the mesh element areas (a direction parallel to one of the arrangement directions of the mesh element areas which are vertically and horizontally arranged). This configuration can prevent the terminal from missing one or more target mesh element areas, thereby enabling the terminal to properly perform a connection destination search operation.

The measurement target extractor 23 acquires history information for target mesh element areas acquired by the destination predictor 26 from the history database and extracts connection destination candidates as targets for communication quality measurement based on the history information for the target mesh element areas.

In this case, when the moving speed of a terminal 1 is high, as shown in FIGS. 21C and 21D, the terminal sets a larger number of target mesh element areas compared to the cases where the moving speed is low, and the terminal extracts targets for measurement by referring to the history information for the target mesh element areas with a shorter time interval. Also, as shown in FIGS. 21B and 21D, when the terminal 1 in a mesh element area moves in a diagonal (inclined) direction relative to one of the arrangement directions of the mesh element areas (a direction not parallel to one of the arrangement directions of the mesh element areas which are vertically and horizontally arranged), the terminal sets a greater number of target mesh element areas with a shorter time interval compared to the cases where the terminal 1 in a mesh element area moves in a parallel direction relative to one of the arrangement directions of the mesh element areas (a direction parallel to one of the arrangement directions of the mesh element areas which are vertically and horizontally arranged). As a result, the terminal can properly extract one or more targets for measurement by referring to the history information for the target mesh element areas.

Also, when a terminal extracts targets for measurement by referring to the history database and finds that a target mesh element area has communication history information for two or more connection destinations, the terminal desirably narrows down the number of targets for communication quality measurement to one (1) to thereby shorten the time required for measurement. For this purpose, the terminal may extract a connection destination in such a manner as the above-described embodiments. The terminal may be configured to extract connection destinations also in consideration of communication quality information such as an expected throughput, a reception power, or a communication data amount for each connection destination.

Moreover, when the history information for a target mesh element area includes information on multiple connection destinations and the moving speed is high, a terminal is preferably configured to extract a larger number of targets for measurement compared to the cases where the moving speed is low. When a terminal 1 in a mesh element area moves in a diagonal (inclined) direction relative to one of the arrangement directions of the mesh element areas (a direction not parallel to one of the arrangement directions of the mesh element areas which are vertically and horizontally arranged), the terminal 1 is preferably configured to extract a larger number of targets for measurement compared to the cases where the terminal moves in a mesh element area in a parallel direction relative to one of the arrangement directions of the mesh element areas (a direction parallel to one of the arrangement directions of the mesh element areas which are vertically and horizontally arranged). As a result, the terminal can avoid re-extracting targets for measurement, thereby enabling the terminal to efficiently perform a connection destination search operation.

When the history information for a target mesh element area includes information on multiple connection destinations, a terminal can avoid re-extracting targets for measurement by increasing the number of extracted targets for measurement. However, an increase in the number of targets for measurement results in a longer connection destination search delay time (a time required to perform a connection destination search operation). As a result, when the moving speed of the terminal 1 is high, a moving distance of the terminal during a connection destination search delay time can become longer, thereby causing the terminal to pass through a destination area before the completion of the connection destination search operation, which disables the terminal to make a connection with an optimal connection destination. Accordingly, an optimal number of extracted targets for measurement cannot be determined simply from the number of connection destinations in the history information for a target mesh element area or from the moving speed of a terminal 1. In this light, in some embodiments, a simulation may be conducted to determine an optimal combination(s) of the moving speed of a terminal 1, the number of connection destinations in the history information for a target mesh element area, the number of extracted targets for measurement, and the connection destination search delay time per one connection destination, so that the terminal can extract targets for measurement based on a result of the simulation.

Next, processing operations performed by the timing controller 27 according to the fifth embodiment of the present invention will be described. FIG. 22 is an explanatory view showing examples of moving distances of the terminal 1 during connection destination search delay times for respective moving speeds of the terminal. FIG. 23 is an explanatory view showing examples for illustrating timing of starting a connection destination search operation by the terminal 1.

In the present embodiment, a terminal 1 acquires the history information for a target mesh element area from the history database, then by referring to the history information for the target mesh element area, extracts connection destination candidates as targets for communication quality measurement, and measures communication quality levels of communications with the target connection destination candidates.

In the present embodiment, the terminal is configured to be capable of completing a connection destination search operation (measurement target extraction and communication quality measurement operations) before entering a target mesh element area, thereby enabling the terminal to make a connection with an optimal connection destination immediately after entering the target mesh element area. For this purpose, the timing controller may be configured to determine a time (position) to start a connection destination search operation in consideration of a moving distance of the terminal 1 during a connection destination search delay time (a time required to perform a connection destination search operation). Specifically, the timing controller is configured to start a connection destination search operation at the timing when a distance from the terminal 1 to a target mesh element area becomes equal to the moving distance of the terminal 1 during the connection destination search delay time.

Referring to FIG. 22, the higher the moving speed of a terminal 1 is, the longer the moving distance of the terminal 1 during a connection destination search delay time is.

Moreover, in the case where the frequency of a current connection destination is different from that of a connection destination as a target for measurement (hereinafter also referred to as "different frequency case"), a connection destination search delay time is longer compared to the case where the frequency of a current connection destination is the same as that of a target for measurement (hereinafter also referred to as "same frequency case"). In the example shown in FIG. 22, it is assumed that, in the same frequency case, the connection destination search delay time is one (1) second, and, in the different frequency case, the connection destination search delay time is 3.85 seconds. It is also assumed that a target for measurement uses one frequency.

As described above, the moving distance of a terminal 1 during a connection destination search delay time changes according to the moving speed of the terminal 1, and the connection destination search delay time in the same frequency case differs from that in the different frequency case. Thus, in the present embodiment, the timing controller is configured to determine a time (position) to start a connection destination search operation depending on the moving speed of a terminal 1 and whether a target for measurement uses the same frequency as or a different frequency from the current connection destination. Specifically, in the same frequency case, the terminal starts a connection destination search operation at the time (position) determined in consideration of the connection destination search delay time for the same frequency case and the moving distance of the terminal at its moving speed, whereas, in the different frequency case, the terminal starts a connection destination search operation at the time (position) determined in consideration of the connection destination search delay time for the different frequency case and the moving distance of the terminal at its moving speed.

FIGS. 23A-1 and 23A-2 show an example in which the moving speed of a terminal 1 is 3 km/h (0.8 m/s), and FIGS. 23B-1 and 23B-2 show an example in which the moving speed of a terminal 1 is 10 km/h (2.8 m/s). It is assumed that the mesh element area size (the length of one side) is 10 m.

As shown in FIG. 23A-1, when the moving speed is 3 km/h and the target for measurement uses the same frequency as the current connection destination, the terminal starts a connection destination search operation (measurement operation) at the position where the distance to the target mesh element area is 0.8 m. As shown in FIG. 23A-2, when the moving speed is 3 km/h and the target for measurement uses a different frequency from the current connection destination, the terminal starts a connection destination search operation (extraction/measurement operations) at the position where the distance to the target mesh element area is 3.2 m.

In the other example, as shown in FIG. 23B-1, when the moving speed is 10 km/h and the target for measurement uses the same frequency as the current connection destination, the terminal starts a connection destination search operation (measurement operation) at the position where the distance to the target mesh element area is 2.8 m. As shown in FIG. 23B-2, when the moving speed is 10 km/h and the target for measurement uses a different frequency from the current connection destination, the terminal starts a connection destination search operation (extraction/measurement operations) at the position where the distance to the target mesh element area is 10.7 m. In this case, the terminal starts a connection destination search operation at the timing when the terminal 1 is located at the position in the second mesh element area before the target mash element area.

In some cases, a terminal extracts multiple connection destination candidates as targets for communication quality measurement so that two or more frequencies are used by the targets for measurement. In such cases, the terminal controls the time to start a connection destination search operation (extraction/measurement operations) according to the number of frequencies to be used by the targets for measurement. For example, when two frequencies are used by the connection destination candidates as targets of extraction/measurement operations, a terminal starts a connection destination search operation (extraction/measurement operations) at the time (position) where the distance to the target mesh element area is as twice as the distance in the case where only one frequency is used by one or more connection destinations as targets of extraction/measurement operations. For example, in the same manner as the example shown in FIG. 23A-2, when the moving speed of a terminal 1 is 3 km/h, the terminal 1 starts a connection destination search operation (extraction/measurement operations) at the time when the distance to the target mesh element area is 6.4 m.

Figure 24:
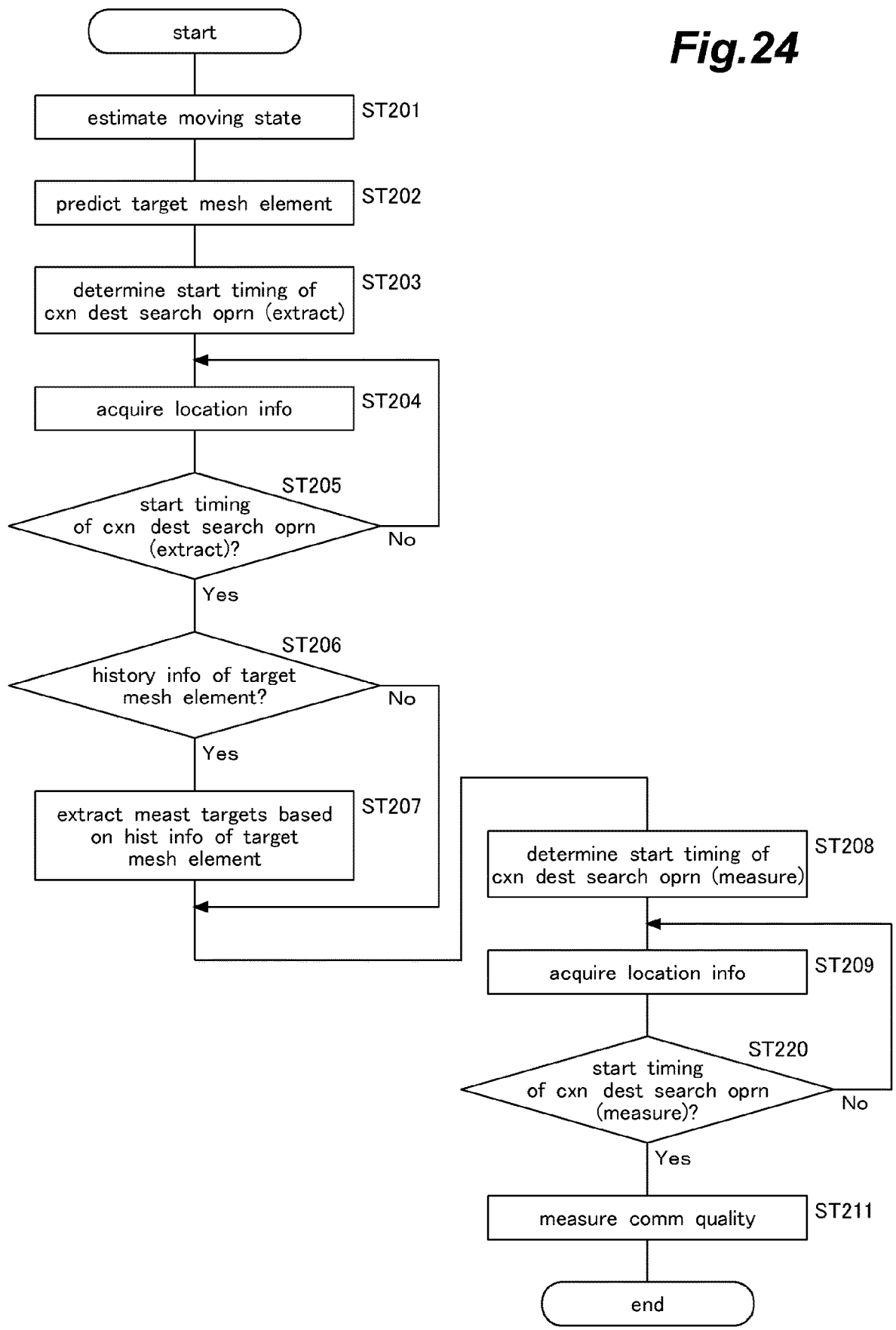
FIG. 24 is a flowchart showing a processing operation procedure performed by the terminal 1 according to the fifth embodiment of the present invention.

Next, a processing operation procedure performed by the terminal 1 according to the fifth embodiment of the present invention will be described. FIG. 24 is a flowchart showing a processing operation procedure performed by the terminal 1.

In the terminal 1, the moving state estimator 25 acquires location information including the current location of the terminal 1 (current location information) from the location information acquisition device 12, acquires past location information from the storage 14, estimates a moving state (moving speed and moving direction) of the terminal 1 based on the current location information and the past location information (ST 201). Next, the destination predictor 26 predicts a target mesh element area to be a destination area based on the moving state of the terminal 1 (ST 202). Next, the timing controller 27 determines a time (position) to start a connection destination search operation (extraction operation) (ST 203).

Next, the controller acquires the current location information from the location information acquisition device 12 (ST 204), and determines, based on the current location information, whether or not it is a time to start a connection destination search operation (extraction operation) (ST 205).

If it is a time to start a connection destination search operation (extraction operation) (Yes in ST 205), the terminal determines whether or not the history database includes history information for a target mesh element area. If the history database includes the history information (Yes in ST 206), the measurement target extractor 23 refers to the history information for the target mesh element area and extracts a connection destination candidate (frequency used for measurement) as a target for measurement (ST 207).

In the process steps, the terminal may extract connection destination candidates as targets for measurement based on past communication times as in the first embodiment, based on past communication times and moving speeds as in the second embodiment, based on past current consumptions as in the third embodiment, or based on past current consumptions and an application currently performing communication as in the fourth embodiment.

Next, the timing controller 27 determines a time (position) to start a connection destination search operation (measurement operation) (ST 208). The timing controller acquires the current location information from the location information acquisition device 12 (ST 209) and determines whether or not it is a time to start the connection destination search operation (measurement operation) based on the current location information (ST 210). If it is a time to start the connection destination search operation (measurement operation) (Yes in ST 210), the communication quality measurer 24 measures a communication quality level of communication with one of the extracted connection destination candidates (ST 211).

If it is not a time to start the connection destination search operation (No in ST 205), the terminal repeats the step of acquiring location information (ST 204) until it is a time to start the connection destination search operation. If there is no history information for a target mesh element area (No in ST 206), the terminal does not perform the extraction of a target for measurement based on history information (ST 207). In this case, the terminal selects a target connection destination as a target for measurement from the connection destination candidate list obtained from the macro cell base station 2.

In the communication quality measurement (ST 211), if the measured communication quality level does not meet a prescribed criterion, the measurement target extractor 23 again performs the extraction of a connection destination candidate as a target for measurement. In other words, the measurement target extractor extracts another connection destination candidate as a target for measurement in the history information for the target mesh element area. If all the connection destination candidates in the history information for the target mesh element area do not meet the prescribed criterion, the measurement target extractor selects a connection destination candidate from the connection destination candidate list obtained from the macro cell base station 2, and then if all the connection destination candidates in the connection destination candidate list do not meet the prescribed criterion, the terminal transmits to the macro cell base station 2 report information indicating that there is no connectable connection destination.

Next, technical effects achieved by the connection destination search operation according to the present embodiment will be described. FIGS. 25 and 26 are explanatory views showing examples for illustrating effects achieved by the connection destination search operation.

In the example shown in FIGS. 25A and 25B, a macro cell, a high SHF band cell and a low SHF band cell overlap one another, part of the boundary of the high SHF band cell is substantially coincident with a side boundary between two adjoining mesh element areas, and one of the target mesh element area and the current mesh element area in which a terminal 1 is currently present is located outside the high SHF band cell and the other of the two areas is located inside the high SHF band cell.

Referring to FIG. 25A, when a terminal 1 enters the high SHF band cell, the first priority of the extraction is given to the high SHF band cell and the second priority is given to the low SHF band cell in the history information for the target mesh element area located in the high SHF band cell, and as a result, the high SHF band cell is extracted as a target for measurement. Since the terminal 1 is currently located in the low SHF band cell and not in the high SHF band cell, the terminal cannot measure a communication quality level associated with the high SHF band cell, resulting in that the terminal cannot complete a connection destination search operation at an earlier point of time.

In the case of FIG. 25B, in which a terminal 1 is leaving the high SHF band cell, the first priority of the extraction is given to the high SHF band cell and the second priority is given to the low SHF band cell in the history information for the mesh element area in which the terminal 1 currently is located, whereas the first priority of the extraction is given to the low SHF band cell and the second priority is given to the macro cell in the history information for the target mesh element area. However, the terminal 1 is currently present in all the cells consisting of the macro cell, the low SHF band cell and the high SHF band cell. Accordingly, the terminal 1 is located in the mesh element area where the terminal 1 is connectable to connection destinations in the high SHF band cell, and can measure a communication quality level associated with the low SHF band cell. Thus, in this case, the terminal 1 can start a connection destination search operation while the terminal is still located in the current mesh element area. As a result, since the terminal can complete the operation at an earlier point of time, the terminal becomes capable of connecting to connection destinations using the low SHF band immediately after leaving the high SHF band cell.

In the example shown in FIGS. 26A and 26B, although the macro cell, the high SHF band cell and the low SHF band cell overlap one another in same manner as the example shown in FIGS. 25A and 25B, any part of the boundary of the high SHF band cell is not coincident with a side boundary between two adjoining mesh element areas, and the current mesh element area in which the terminal 1 is currently located extends over the boundary between the high SHF band cell and the low SHF band cell. In the example shown in FIGS. 26A and 26B, the terminal 1 enters the high SHF band cell in the same manner as the example of FIG. 25A.

In the case of FIG. 26A, the first priority of the extraction is given to the low SHF band cell and the second priority is given to the high SHF band cell in the history information for the target mesh element area. When the number of the extracted connection destination is one (1), a connection destination candidate as a target for measurement is extracted only from the low SHF band, and when the number of the extracted connection destinations is two (2), one of the connection destination candidates as targets for measurement is extracted from the low SHF band and the other of the candidates is extracted from the high SHF band. Even when the next target mesh element area is included in a target area for connection destination extraction, connection destination candidates as targets for measurement are extracted from both the low SHF band cell and the high SHF band cell. In the case shown in FIG. 26B, since the mesh element area in which the terminal 1 is currently located extends over the boundary between the high SHF band cell and the low SHF band cell, connection destination candidates as targets for measurement can be extracted not only from the low SHF band but also from the high SHF band. Thus, in this case, the terminal 1 can start to measure a communication quality level of communication with a connection destination candidate in the high SHF band cell to thereby complete the connection destination search operation at an earlier point of time.

Figure 27:
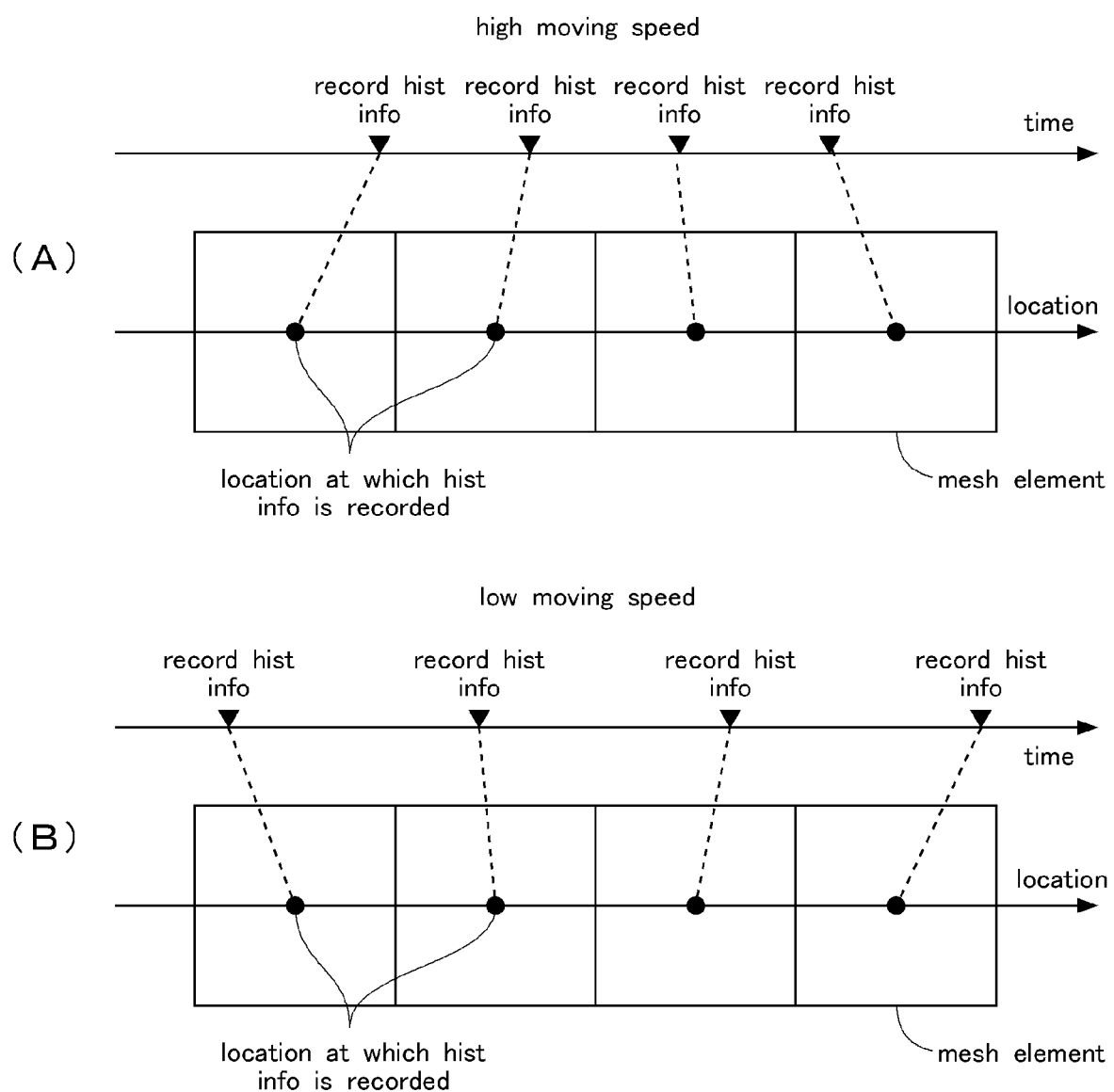
FIG. 27 is an explanatory view showing an outline of processing operations performed by a history data recorder 22 according to the fifth embodiment of the present invention.

Next, processing operations performed by a history data recorder 22 according to the fifth embodiment of the present invention will be described. FIG. 27 is an explanatory view showing an outline of processing operations performed by the history data recorder 22.

The history data recorder 22 acquires information on communication status (connection destination information and communication quality information) when a terminal 1 is located in a mesh element area, and records the information into the history database as the history information for the current mesh element area. By periodically performing the recordation of history information, the history data recorder can record data sets of history information into the history database for respective mesh element areas covering sections in which the terminal 1 has moved.

The time interval with which the history data recorder performs the recordation of history information may be set based on a mesh element area size, a connection destination search delay time, and/or a moving speed of the terminal 1.

In the example shown in FIG. 27, the time interval with which the history data recorder performs the recordation of history information is set according to the moving speed. As shown in FIG. 27A, when the moving speed is fast, the time interval with which the history data recorder performs the recordation of history information is set short. As shown in FIG. 27B, when the moving speed is slow, the time interval with which the history data recorder performs the recordation of history information is set long. In this way, all mesh element areas can be of the same size regardless of the moving speed at which the terminal moves.

For example, in the case where the mesh element area size (the length of each side of a mesh element area) is 11.2 m and a connection destination search delay time is one (1) second, when the moving speed of the terminal 1 is 10 km/h (2.8 m/s), the time interval with which the history data recorder performs the recordation of history information is set to be four (4) seconds, whereas, when the moving speed of the terminal 1 is 20 km/h (5.6 m/s), the time interval with which the history data recorder performs the recordation of history information is set to be two (2) seconds. As a result, the recordation of history information is performed at 11.2-meter intervals so that the history information can be recorded one by one on each 11.2-meter sized mesh element area.

In this way, when the terminal is configured to be capable of changing the time interval with which the recorder performs the recordation of history information according to the moving speed such that mesh element areas can be of the same size, the terminal can record a constant number (one in FIG. 27) of data sets of history information for each mesh element area, which can reduce a storage capacity required for the history database.

Figure 28:
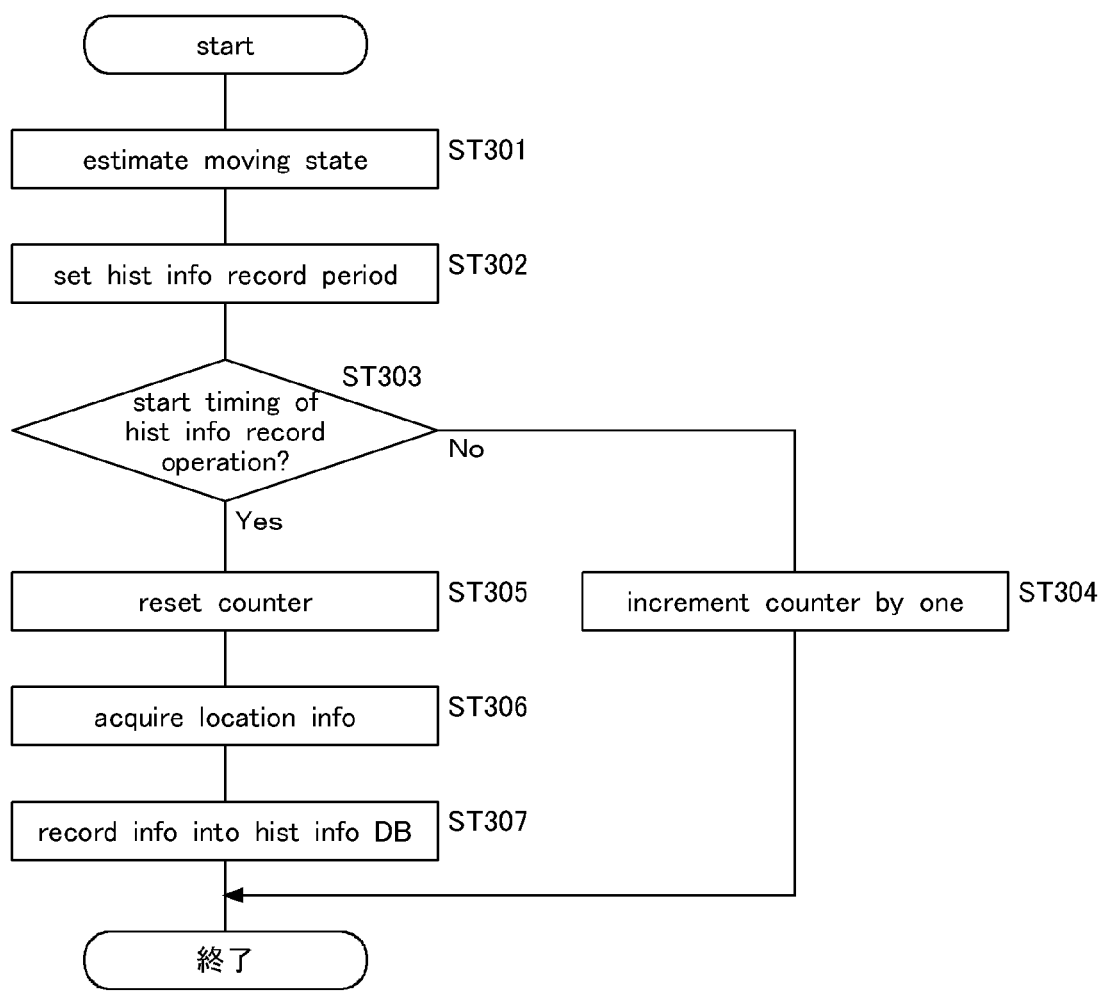
FIG. 28 is a flowchart showing a processing operation procedure performed by the history data recorder 22 according to the fifth embodiment of the present invention.

Next, a processing operation procedure performed by the history data recorder 22 according to the fifth embodiment of the present invention will be described. FIG. 28 is a flowchart showing a processing operation procedure performed by the history data recorder 22.

First, after the moving state estimator 25 acquires current location information from the location information acquisition device 12 and also acquires past location information from the storage 14, the moving state estimator 25 estimates a moving state (moving speed and moving direction) of the terminal 1 based on the current location information and the past location information (ST 301). Next, the history data recorder 22 sets an time interval with which the history data recorder performs the recordation of history information based on the moving state of the terminal 1 (ST 302).

Next, the terminal determines whether or not it is a time to perform the recordation of history information based on whether or not the count value of a counter reaches a target value corresponding to the time interval with which the history data recorder performs the recordation of history information (ST 303). When it is not a time to performs the recordation of history information (No in ST 203), the counter is incremented by one (1) (ST 304).

If it is a time to performs the recordation of history information (Yes in ST 303), the counter is reset (ST 305). Next, the controller acquires the current location information from the location information acquisition device 12 (ST 306). Then, the controller determines a mesh element area in which the terminal 1 is currently located based on the current location information, and acquires current communication status information (connection destination information and communication quality information). Then, the history data recorder records the acquired information along with a moving speed into the history database as history information for the mesh element area (ST 307).

Figure 29:
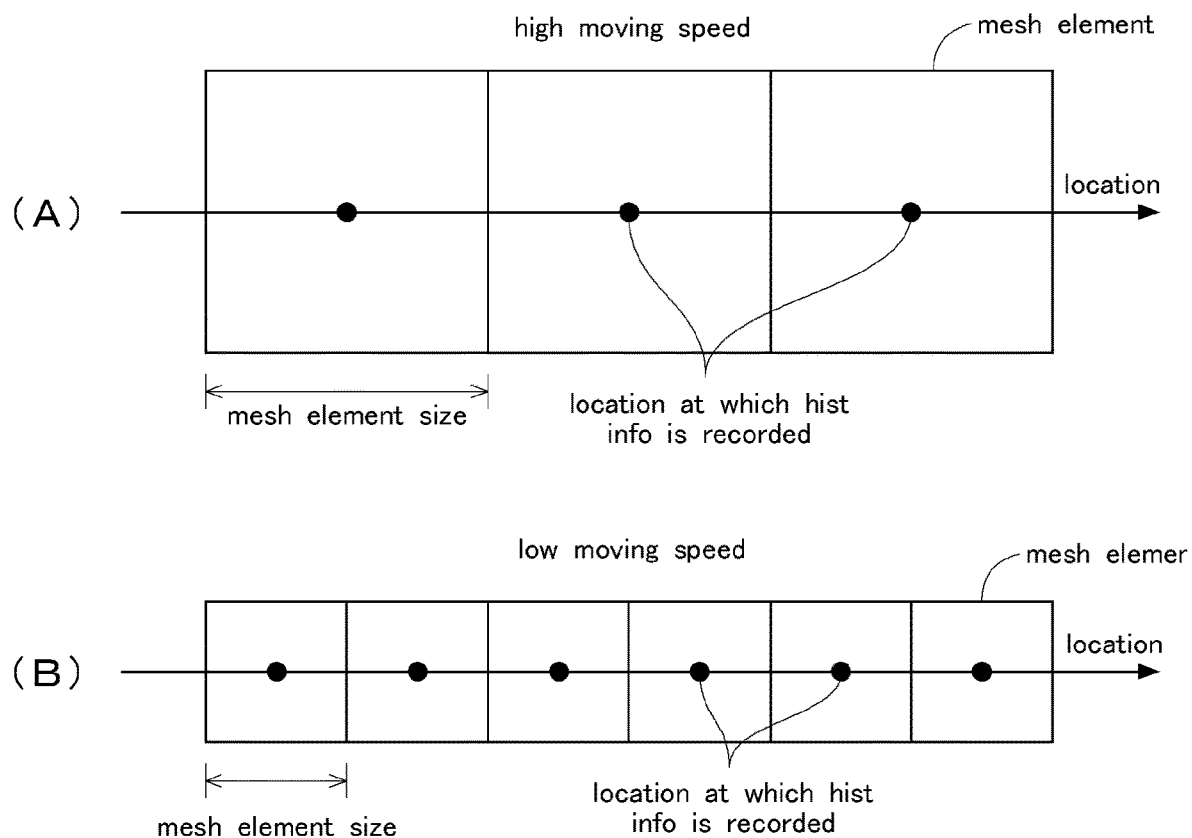
FIG. 29 is an explanatory view showing an outline of processing operations of another example performed the history data recorder 22 according to the fifth embodiment of the present invention.

Next, processing operations of another example performed the history data recorder 22 according to the fifth embodiment of the present invention will be described. FIG. 29 is an explanatory view showing an outline of processing operations of another example performed the history data recorder 22.

In the example in FIG. 27 the history data recorder changes the time interval with which the history data recorder performs the recordation of history information depending on the moving speed of a terminal 1. However, the history data recorder may be configured to perform the recordation of history information with a constant time interval. In this case, as shown in FIG. 29, the mesh element area size is changed according to the moving speed of a terminal 1. Specifically, when the moving speed of a terminal is fast, the mesh element area size is increased, and when the moving speed of a terminal is slow, the mesh element area size is decreased.

In the example shown in FIG. 29, the moving speed during the high speed movement of the terminal shown in FIG. 29A is twice as fast as that in the low moving speed case shown in FIG. 29B. For example, in the case where the time interval with which the history data recorder performs the recordation of history information is one (1) second, when the moving speed is 10 km/h (2.8 m/s), the recordation of history information is performed at 2.8-meter intervals, and thus the mesh element area size (the length of each side of a mesh element area) becomes 2.8 m, whereas, when the moving speed is 20 km/h (5.6 m/s), the recordation of history information is performed at 5.6-meter intervals, and thus the mesh element area size becomes 5.6 m.

In this way, when the moving speed of a terminal is high, the mesh element area size is increased, which can reduce a storage capacity required for the history database. An increase in the mesh element area size prevents a terminal from excessively frequently performing a connection destination search operation, thereby enabling the power saving of the terminal 1. Although an increase in the mesh element area size results in a longer time interval with which a terminal performs a connection destination search operation, this does not incur any practical trouble because a higher moving speed shortens a period of time in which the terminal is present in each mesh element area.

When a terminal performs the recordation of history information with a constant interval, the intervals of locations at which the terminal performs the recordation of history information is changed depending on the moving speed of the terminal 1, which means that the mesh element area size is changed accordingly. Thus, when the moving speed of a terminal 1 varies in a single section in which the terminal moves, it becomes necessary for the terminal to prepare respective data sets in the history database for different moving speeds.

However, it can be assumed that the moving speed at certain locations is generally constant because of a user's behavioral pattern. Specifically, sections where a user moves on foot and those where the user moves in a vehicle are generally unchanged. Thus, in the sections where the user moves on foot, the terminal moves at a lower moving speed, and, in the sections where the user moves in the vehicle, the terminal moves at a higher moving speed. As a result, data sets in a single history database can indicate that the mesh element area size is small for the sections where a user moves on foot and that the mesh element area size is large for the sections where the user moves in a vehicle.

For this reason, even if a terminal performs the recordation of history information with a constant time interval, the terminal may be configured to record history information for each mesh element area, the history information including a corresponding mesh element area size for a certain moving speed, into a single history database, thereby enabling optimization of the storage capacity of the history database.

Figure 30:
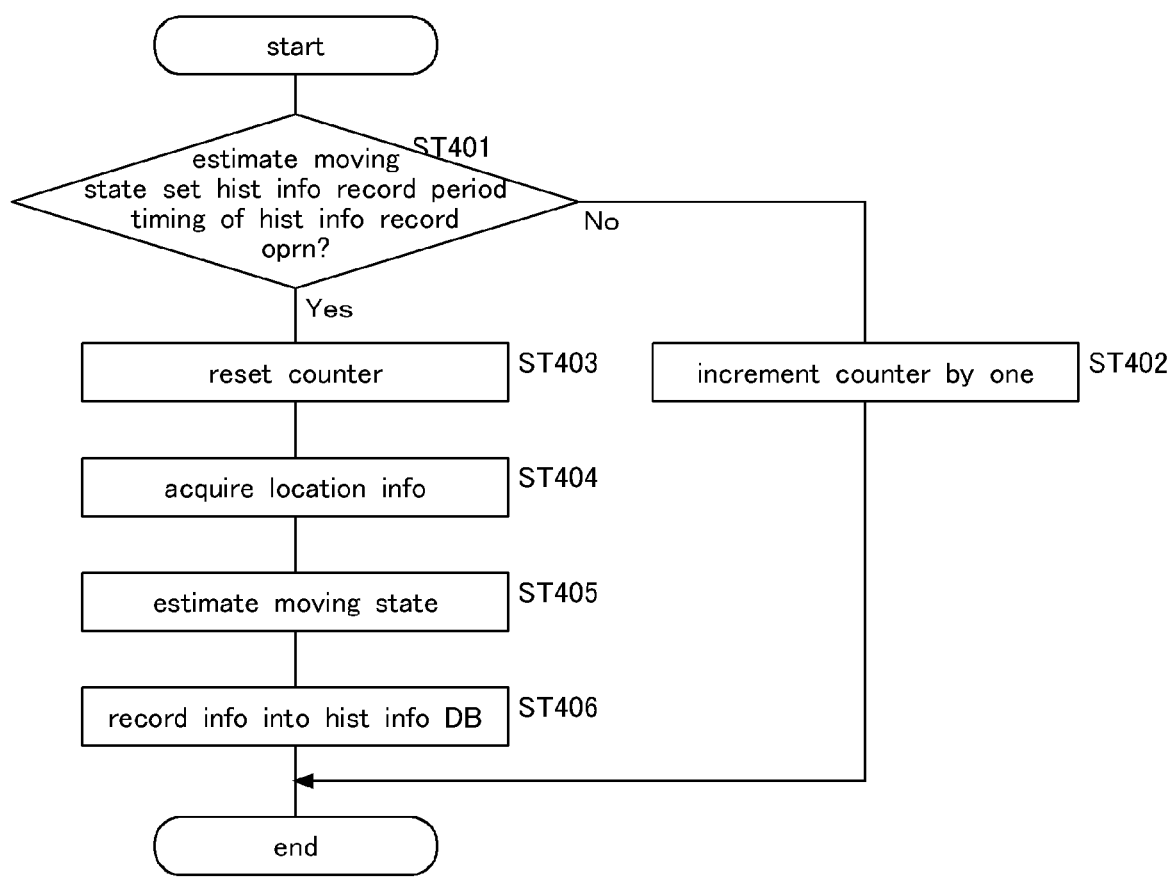
FIG. 30 is a flowchart showing a processing operation procedure of another example performed by the history data recorder 22 according to the fifth embodiment of the present invention.

Next, a processing operation procedure of another example performed by the history data recorder 22 according to the fifth embodiment of the present invention will be described. FIG. 30 is a flowchart showing a processing operation procedure of another example performed by the history data recorder 22.

First, the history data recorder 22 determines whether or not it is a time to record history information based on whether or not the count value of a counter reaches a target value corresponding to the time interval with which the history data recorder performs the recordation of history information (ST 401). When it is not a time to record history information (No in ST 401), the counter is incremented by one (1) (ST 402).

If it is a time to record history information (Yes in ST 401), the counter is reset (ST 403). Next, the controller acquires current location information from the location information acquisition device 12 and also acquires past location information from the storage 14 (ST 404). Next, the controller estimate a moving state of a terminal 1 (moving speed) based on the current location information and the past location information (ST 405). Then, the controller acquires information on communication status (connection destination information and communication quality information), and records the acquired information and the moving speed into a history database as the history information for the current mesh element area (ST 406).

The processing operations performed by a history data recorder 22 according to the present embodiment may be used in the above-described first to third embodiments.

While specific embodiments of the present invention are described herein for illustrative purposes, the present invention is not limited to those specific embodiments. It will be understood that various changes, substitutions, additions, and omissions may be made for elements of the embodiments without departing from the scope of the invention. In addition, elements and features of the different embodiments may be combined with each other as appropriate to yield a new embodiment which is within the scope of the present invention.

INDUSTRIAL APPLICABILITY

A terminal device, a communication system, and a communication control method according to the present invention enable each terminal device to narrow down targets of communication quality measurement, thereby allowing a terminal device to efficiently search and find a proper connection destination and minimizing occurrence of unnecessary handovers to improve a system's processing capacity, and are useful as a terminal device for communicating with one or more base station devices, a base station device for communicating with terminal devices, a communication system comprising a terminal device and base station devices, and a communication control method performed by a terminal device for communicating with one or more base station devices.

Glossary 1 terminal (terminal device)
2 macro cell base station (base station device)
3 low SHF band base station (base station device)
4 high SHF band base station (base station device)
5 wireless LAN base station (base station device)
11 communication device
12 location information acquisition device
13 controller
14 storage

The invention claimed is:

1. A terminal device for communicating with one or more base station devices, the terminal device comprising:
a location information acquisition device configured to acquire location information including a location of the terminal device;
a storage configured to accumulate history information on past communication status, the past communication status including at least a communication time of the terminal device at each location;
a controller configured to
acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations,
correct the respective communication times for connection destination candidates so as to lower an evaluation of a connection destination candidate to which a handover is necessary for the terminal device to start communication therewith, and
extract the communication destinations as the targets of communication quality measurement based on the corrected communication times.

2. The terminal device according to claim 1, wherein the storage stores a communication time table including a required communication time for each application, and
wherein the controller is configured to acquire an expected communication time for each connection destination candidate based on a corresponding communication time and a corresponding handover cost, the handover cost being preset based on whether or not a handover is necessary for the terminal device to start communication therewith, to acquire a required communication time for an application currently performing communication based on the communication time table, and to select one or more connection destinations, the selected connection destinations having expected communication times which are equal to or greater than the required communication time, as the targets of communication quality measurement.

3. A terminal device for communicating with one or more base station devices, the terminal device comprising:
a location information acquisition device configured to acquire location information including a location of the terminal device;

a storage configured to accumulate history information on past communication status, the past communication status including at least a communication time of the terminal device at each location; and a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations, wherein the storage accumulates the history information which further includes a moving speed at each location, and wherein the controller is configured to extract the communication destinations as the targets of communication quality measurement bases on the communication times for the connection destination candidates and the moving speeds related thereto.

4. The terminal device according to claim 3, wherein the storage stores a communication time table including a required communication time for each application, and wherein the controller is configured to acquire an expected communication time for each connection destination candidate based on a corresponding communication time and a corresponding handover cost, the handover cost being preset based on whether or not a handover is necessary for the terminal device to start communication therewith, to acquire a required communication time for an application currently performing communication based on the communication time table, and to select one or more connection destinations, the selected connection destinations having expected communication times which are equal to or greater than the required communication time, as the targets of communication quality measurement.

5. A terminal device for communicating with one or more base station devices, the terminal device comprising:

a location information acquisition device configured to acquire location information including a location of the terminal device;

a storage configured to accumulate history information on past communication status, the past communication status including at least a current consumption of the terminal device at each location;

a controller configured to acquire the history information for a current location of the terminal device from the storage based on the location information, to extract one or more connection destinations as targets of communication quality measurement from connection destination candidates, the connection destination candidates being the base station devices connectable to the terminal device, based on current consumptions for the connection destination candidates, and to measure communication quality levels of communications with the extracted connection destinations.

6. The terminal device according to claim 5, wherein the storage stores a current consumption table including a required current consumption for each application, and wherein the controller is configured to acquire an expected current consumption for each connection destination candidate based on a corresponding current consumption and a corresponding handover cost, the handover cost being preset based on whether or not a handover is necessary for the terminal device to start communication therewith, to acquire a required current consumption for an application currently performing communication based on the current consumption table, and to select one or more connection destinations, the selected connection destinations having expected current consumptions which are equal to or greater than the required current consumption, as the targets of communication quality measurement.

7. The terminal device according to claim 5, wherein the storage accumulates application ID information indicating each application ID of an application currently performing communication, and wherein the controller is configured to extract the communication destinations as the targets of communication quality measurement bases on the current consumptions for the connection destination candidates and the application ID information for an application currently performing communication.

8. The terminal device according to claim 7, wherein the storage stores a current consumption table including a required current consumption for each application, and wherein the controller is configured to acquire an expected current consumption for each connection destination candidate based on a corresponding current consumption, the application ID information, and a corresponding handover cost, the handover cost being preset based on whether or not a handover is necessary for the terminal device to start communication therewith, to acquire a required current consumption for an application currently performing communication based the current consumption table, and to select one or more connection destinations, the selected connection destinations having expected current consumptions which are equal to or greater than the required current consumption, as the targets of communication quality measurement.

9. A communication system comprising a terminal device and one or more base station devices which perform communication with the terminal device, wherein the terminal device comprises:

a location information acquisition device configured to acquire location information including a location of the terminal device;

a storage configured to accumulate history information on past communication status, the past communication status including at least a communication time of the terminal device at each location; and a controller configured to acquire the history information for a current location of the terminal device from the storage based on the location information, to extract one or more connection destinations as targets of communication quality measurement from connection destination candidates, the connection destination candidates being the base station devices connectable to the terminal device, based on communication times for the connection destination candidates, and to measure communication quality levels of communications with the extracted connection destinations, correct the respective communication times for connection destination candidates so as to lower an evaluation of a connection destination candidate to which a handover is necessary for the terminal device to start communication therewith, and extract the communication destinations as the targets of communication quality measurement based on the corrected communication times.

10. A communication system comprising a terminal device and one or more base station devices which perform communication with the terminal device,
wherein the terminal device comprises:
a location information acquisition device configured to acquire location information including a location of the terminal device;
a storage configured to accumulate history information on past communication status, the past communication status including at least a current consumption of the terminal device at each location; and
a controller configured to acquire the history information for a current location of the terminal device from the storage based on the location information, to extract one or more connection destinations as targets of communication quality measurement from connection destination candidates, the connection destination candidates being the base station devices connectable to the terminal device, based on current consumptions for the connection destination candidates, and to measure communication quality levels of communications with the extracted connection destinations.

11. A communication control method performed by a terminal device for communicating with one or more base station devices, the method comprising:
acquiring location information including a location of the terminal device;
acquiring history information for a current location of the terminal device from accumulated history information on past communication status, the past communication status including at least a communication time of the terminal device at each location;
extracting one or more connection destinations as targets of communication quality measurement from connection destination candidates, the connection destination candidates being the base station devices connectable to the terminal device, based on communication times for the connection destination candidates;
measuring communication quality levels of communications with the extracted connection destinations;
correcting the respective communication times for connection destination candidates so as to lower an evaluation of a connection destination candidate to which a handover is necessary for the terminal device to start communication therewith; and
extracting the communication destinations as the targets of communication quality measurement based on the corrected communication times.

12. A communication control method performed by a terminal device for communicating with one or more base station devices, the method comprising:
acquiring location information including a location of the terminal device;
acquiring history information for a current location of the terminal device from accumulated history information on past communication status, the past communication status including at least a current consumption of the terminal device at each location;
extracting one or more connection destinations as targets of communication quality measurement from connection destination candidates, the connection destination candidates being the base station devices connectable to the terminal device, based on current consumptions for the connection destination candidates; and
measuring communication quality levels of communications with the extracted connection destinations.

* * * * *